US012645707B2

(12) United States Patent　　(10) Patent No.: US 12,645,707 B2
Swanson et al.　　(45) Date of Patent: Jun. 2, 2026

(54) ARTIFICIAL INTELLIGENCE GENERATED CORRELATORS FOR BUILDING DIGITAL TWIN

(71) Applicant: Tyco Fire & Security GmbH, Neuhausen am Rheinfall (CH)

(72) Inventors: Trent M. Swanson, Wellington, FL (US); Miguel Galvez, Westford, MA (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 18/646,590

(22) Filed: Apr. 25, 2024

(65) Prior Publication Data

US 2024/0394281 A1　Nov. 28, 2024

Related U.S. Application Data

(60) Provisional application No. 63/468,670, filed on May 24, 2023.

(51) Int. Cl.
*G06F 7/00*　(2006.01)
*G06F 16/242*　(2019.01)
(Continued)

(52) U.S. Cl.
CPC .......... *G06F 16/288* (2019.01); *G06F 16/243* (2019.01); *G06F 16/248* (2019.01)

(58) Field of Classification Search
CPC .... G06F 16/245; G06F 16/243; G06F 16/248; G06F 16/287; G06F 16/288; G06F 16/9024; G06F 16/2477; G06F 16/2428;
G06F 16/9558; G06F 16/9535; G06F 16/3344; G06F 16/2425; G06F 16/2455; G06F 16/24578; G06F 16/14; G06F 16/38; G06F 40/30; G06F 40/56; G06F 40/58; G06F 40/205; G06F 40/40; G06F 3/0482;
(Continued)

(56) References Cited

U.S. PATENT DOCUMENTS 7,680,818 B1 * 3/2010 Fan ......................... G06F 16/20
707/999.103
11,018,889 B2 5/2021 Park et al.
(Continued)

OTHER PUBLICATIONS

U.S. Appl. No. 18/438,195, filed Feb. 9, 2024, Lu et al.

*Primary Examiner* — Mohammad A Sana

(74) *Attorney, Agent, or Firm* — Foley & Lardner LLP

(57) ABSTRACT

A building system can include one or more storage devices storing instructions thereon, that, when executed by one or more processors, cause the one or more processors to generate a building graph, the building graph including nodes representing entities of a building and edges between the nodes, the edges representing relationships between the entities. The building system can execute an artificial intelligence service, the artificial intelligence service to receive at least one of data describing the entities, at least one node of the nodes, or at least one edge of the edges as an input and output a correlator type that identifies that a first entity type of a first entity of the entities impacts a second entity type of a second entity of the entities. The building system can update the building graph to include data representing a correlator based on the correlator type.

18 Claims, 10 Drawing Sheets

(51) Int. Cl.
　　*G06F 16/248*　　　(2019.01)
　　*G06F 16/28*　　　(2019.01)

(58) Field of Classification Search
　　CPC . G06F 3/045; H04L 12/2832; H04L 12/2812;
　　　　　　　　　　　　H04L 12/2827; H04L 12/2809
　　See application file for complete search history.

(56)　　　　　　　References Cited

U.S. PATENT DOCUMENTS

| | | | |
|---|---|---|---|
| 11,018,890 B2 | 5/2021 | Park et al. | |
| 11,018,891 B2 | 5/2021 | Park et al. | |
| 2008/0183658 A1* | 7/2008 | Mangipudi | G06F 16/254 |
| 2016/0371360 A1* | 12/2016 | Chorin | G06F 16/282 |
| 2019/0158309 A1* | 5/2019 | Park | H04L 12/2812 |
| 2021/0200807 A1 | 7/2021 | Ploegert et al. | |
| 2023/0169220 A1 | 6/2023 | Ramanasankaran et al. | |
| 2023/0185983 A1 | 6/2023 | Ramanasankaran et al. | |
| 2023/0213909 A1 | 7/2023 | Galvez et al. | |
| 2024/0036537 A1 | 2/2024 | Gupta et al. | |
| 2024/0126227 A1 | 4/2024 | Kammela et al. | |
| 2024/0291877 A1* | 8/2024 | Huang | H04N 21/2187 |

* cited by examiner

Digital Twin 800

1100

Generate digital twin 1005

Execute artificial intelligence service to generate correlator type 1010

Update digital twin with correlator 1015

ARTIFICIAL INTELLIGENCE GENERATED CORRELATORS FOR BUILDING DIGITAL TWIN

CROSS-REFERENCE TO RELATED PATENT APPLICATION

This application claims the benefit of, and priority to, U.S. Provisional Patent Application No. 63/468,670 filed May 24, 2023, the entirety of which is incorporated by reference herein.

BACKGROUND

This application relates generally to a building system of a building. This application relates more particularly to systems for managing and processing data of the building system. A database or data structure can relate multiple pieces of information. The database or data structure can be generated or based on data. However, the data may not explicitly indicate relationships between the pieces of information. Therefore, a computing system may not be able to determine relationship between pieces of information unless the relationships are specified explicitly in the data.

SUMMARY

One implementation of the present disclosure is a building system. The building system can include one or more storage devices storing instructions thereon, that, when executed by one or more processors, cause the one or more processors to generate a building graph, the building graph including nodes representing entities of a building and edges between the of nodes, the edges representing relationships between the entities. The building system can operate to execute an artificial intelligence service, the artificial intelligence service to receive at least one of data describing the entities, at least one node of the nodes, or at least one edge of the edges as an input and output a correlator type that identifies that a first entity type of a first entity of the entities impacts a second entity type of a second entity of the entities. The building system can operate to update the building graph to include data representing a correlator based on the correlator type.

In some embodiments, the instructions can cause the one or more processors to execute the artificial intelligence service to output an indication to decorrelate a first node of the plurality of nodes and a second node of the plurality of nodes of the building graph. In some embodiments, the instructions can cause the one or more processors to remove an edge of the plurality of edges between the first node and the second node responsive to the indication to decorrelate the first node and the second node.

In some embodiments, the instructions can cause the one or more processors to execute the artificial intelligence service after the building graph is deployed for the building to detect changes to the building that occur after the building graph is deployed. In some embodiments, the instructions can cause the one or more processors to update the building graph while the building graph is deployed responsive to detecting the changes.

In some embodiments, the artificial intelligence service is a large language model that receives at least a portion of the building graph as input strings and outputs the correlator type as an output string.

In some embodiments, the instructions cause the one or more processors to generate an entity type for an entity to represent a correlation between the first entity of the first entity type and the second entity of the second entity type and update the building graph to store a node representing the entity, a first edge between a first node representing the first entity and the node, and a second edge between a second node representing the second entity and the node.

In some embodiments, the correlator indicates that the first entity of the first entity type affects an operational performance of the second entity of the second entity type.

In some embodiments, the instructions cause the one or more processors to execute the artificial intelligence service to output the correlator type without using any data indicating a direct relationship between the first entity and the second entity.

In some embodiments, the instructions cause the one or more processors to generate data to cause a graphical user interface to display the correlator type, receive input from a user via the graphical user interface, and update the building graph with the correlator type responsive to a reception of the input from the user via the graphical user interface.

In some embodiments, the edges are defined based on available edge types. In some embodiments, the instructions cause the one or more processors to generate an edge type that indicates a correlation between the first entity of the first entity type and the second entity of the second entity type and update the building graph to store an edge based on the edge type between a first node representing the first entity and a second node representing the second entity.

In some embodiments, the instructions cause the one or more processors to identify a third entity of the first entity type represented by a third node in the building graph, identify a fourth entity of the second entity type represented by a fourth node in the building graph, and generate a second edge of the edge type responsive to an identification of the third entity of the first entity type and the fourth entity of the second entity type, and update the building graph to store the second edge between the third node and the fourth node.

In some embodiments, the instructions cause the one or more processors to instantiate a correlator artificial intelligence service to process data based on the first entity impacting the second entity and execute the correlator artificial intelligence service to generate output data indicating an impact that the first entity has on the second entity.

In some embodiments, the instructions cause the one or more processors to identify a third entity impacting a fourth entity in the building graph, replicate the correlator artificial intelligence service to generate a second correlator artificial intelligence service, and execute the second correlator artificial intelligence service to generate second output data indicating an impact that the third entity has on the fourth entity.

In some embodiments, the instructions cause the one or more processors to instantiate the correlator artificial intelligence service to run for a length of time, execute the correlator artificial intelligence service until the length of time expires, and stop executing the correlator artificial intelligence service in response to the length of time expiring.

Another implementation of the present disclosure is a method. The method can include generating, by one or more processing circuits, a building graph, the building graph including a nodes representing entities of a building and edges between the nodes, the edges representing relationships between the entities. The method can include executing, by the one or more processing circuits, an artificial intelligence service, the artificial intelligence service to receive at least one of data describing the entities, at least one node of the nodes, or at least one edge of the edges as an input and output a correlator type that identifies that a first entity type of a first entity of the entities impacts a second entity type of a second entity of the entities. The method can include updating, by the one or more processing circuits, the building graph to include data representing a correlator based on the correlator type.

In some embodiments, the artificial intelligence service is a large language model that receives at least a portion of the building graph as input strings and outputs the correlator type as an output string.

In some embodiments, the method includes generating, by the one or more processing circuits, an entity type for an entity to represent a correlation between the first entity of the first entity type and the second entity of the second entity type and updating, by the one or more processing circuits, the building graph to store a node representing the entity, a first edge between a first node representing the first entity and the node, and a second edge between a second node representing the second entity and the node.

In some embodiments, the correlator indicates that the first entity of the first entity type affects an operational performance of the second entity of the second entity type.

In some embodiments, the method includes executing, by the one or more processing circuits, the artificial intelligence service to output the correlator type without using any data indicating a direct relationship between the first entity and the second entity.

In some embodiments, the method includes generating, by the one or more processing circuits, data to cause a graphical user interface to display the correlator type, receiving, by the one or more processing circuits, input from a user via the graphical user interface, and updating, by the one or more processing circuits, the building graph with the correlator type responsive to a reception of the input from the user via the graphical user interface.

In some embodiments, the edges are defined based on available edge types. In some embodiments, the method includes generating, by the one or more processing circuits, an edge type that indicates a correlation between the first entity of the first entity type and the second entity of the second entity type and updating, by the one or more processing circuits, the building graph to store an edge based on the edge type between a first node representing the first entity and a second node representing the second entity.

In some embodiments, the method includes identifying, by the one or more processing circuits, a third entity of the first entity type represented by a third node in the building graph, identifying, by the one or more processing circuits, a fourth entity of the second entity type represented by a fourth node in the building graph, generating, by the one or more processing circuits, a second edge of the edge type responsive to an identification of the third entity of the first entity type and the fourth entity of the second entity type, and updating, by the one or more processing circuits, the building graph to store the second edge between the third node and the fourth node.

At least one implementation is directed to one or more storage media storing instructions thereon, that, when executed by one or more processors, cause the one or more processors to generate a digital twin, the digital twin including data representing entities of a building and relationships between the entities. The instructions cause the one or more processors to execute an artificial intelligence service, the artificial intelligence service to receive at least one of data describing the entities or a portion of the digital twin and output a correlator type that identifies that a first entity type of a first entity of the entities impacts a second entity type of a second entity of the entities. The instructions cause the one or more processors to update the digital twin to include data representing a correlator based on the correlator type.

In some implementations, the artificial intelligence service includes a causal artificial intelligence to identify a causal relationship between the first entity and the second entity.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Figure 1:
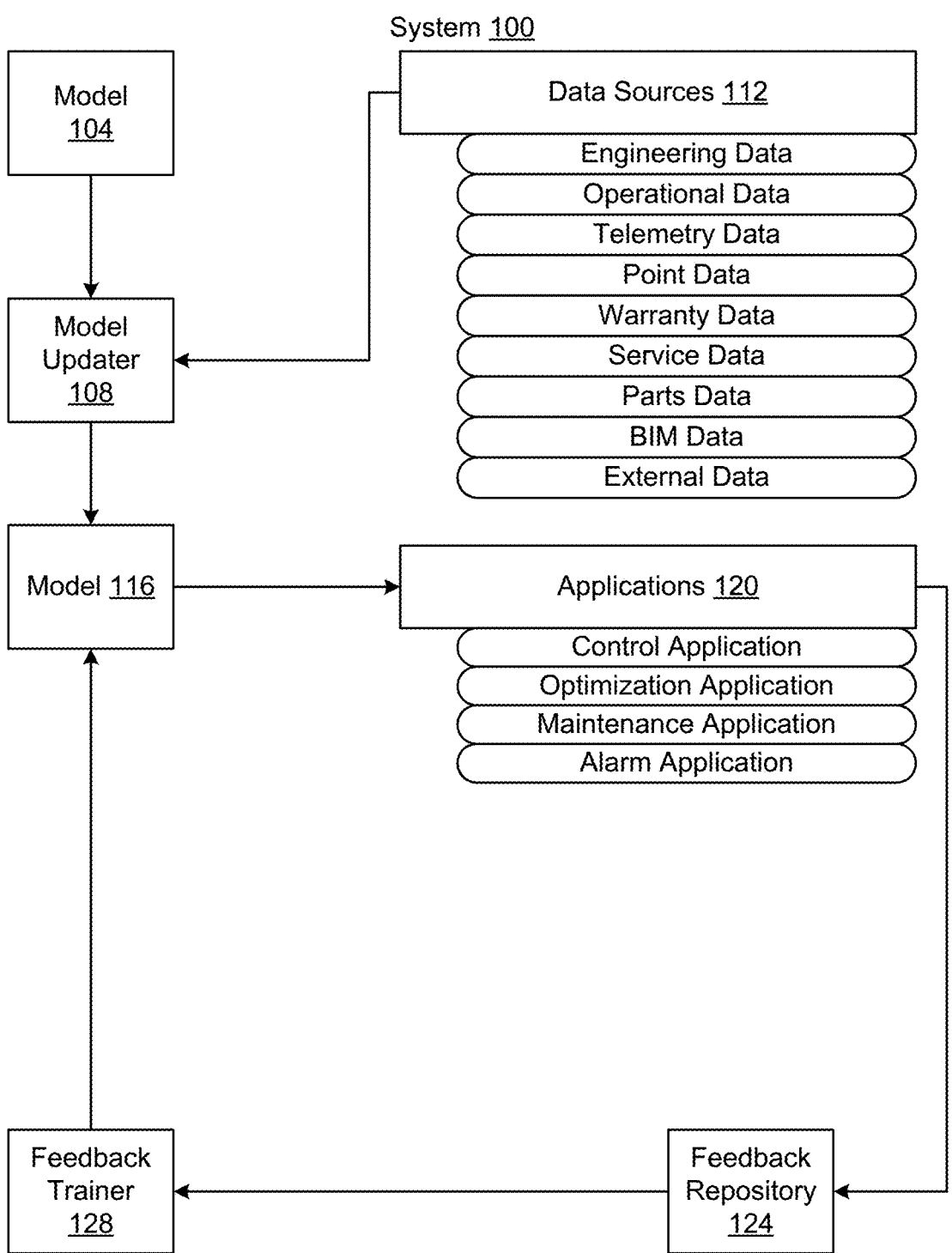
FIG. 1 is a block diagram of an example of a machine learning model-based system for equipment servicing applications.

Referring generally to the FIGURES, systems and methods in accordance with the present disclosure can implement various systems to precisely generate data relating to operations to be performed for managing building systems and components and/or items of equipment, including heating, ventilation, cooling, and/or refrigeration (HVAC-R) systems and components.

In some embodiments, a digital twin system can include a digital twin that stores data representing entities of a building and relationships between the entities. A system or user can utilize the digital twin to understand how the entities of the building are related. However, often, data used to generate the digital twin may not indicate correlations or other relational information between two entities. In this regard, a system that generates a digital twin may not capture all of the relationships between entities of a building, unless those relationships are directly indicated in building data.

To solve these and other technical challenges, the digital twin system can utilize an artificial intelligence service, such as an large language model (LLM), to determine correlations between entities (e.g., a first entity and a second entity) that are not expressly or directly indicated in data. For example, the artificial intelligence system can infer that a first entity is related to a second entity, e.g., the first entity impacts the second entity or data associated with the first entity is correlated with data of the second entity. This can allow for the digital twin to adapt and change over time to implement autoconfiguration functionality after a digital twin has been installed for a building, e.g., respond to new pieces of equipment being added to a building, removed from a building, etc. The digital twin system can create a new type of relationship to represent the correlation. The digital twin system can create the relationship type to indicate that a specific type of relationship is available to relate an entity of a first type with an entity of a second type. For example, the digital twin system can generate a relationship type between a zone and a thermostat, or between a person and a zone, or between a controller and an actuator. The digital twin system can update an ontology or schema that stores available relationship types to include the new relationship type that the LLM discovered. The digital twin system can use the relationship type to update the digital twin to store a new relationship between the first entity and the second entity defined based on the relationship type. The resulting digital twin can be a dynamic component rather than a static component that can adapt to represent changes at a building.

AI and/or machine learning (ML) systems, including but not limited to LLMs, can be used to generate text data and data of other modalities in a more responsive manner to real-time conditions, including generating strings of text data that may not be provided in the same manner in existing documents, yet may still meet criteria for useful text information, such as relevance, style, and coherence. For example, LLMs can predict text data based at least on inputted prompts and by being configured (e.g., trained, modified, updated, fine-tuned) according to training data representative of the text data to predict or otherwise generate.

Systems and methods in accordance with the present disclosure can leverage the efficiency of language models (e.g., GPT-based models or other pre-trained LLMs) in extracting semantic information (e.g., semantic information identifying faults, causes of faults, and other accurate expert knowledge regarding equipment servicing) from the unstructured data in order to use both the unstructured data and the data relating to equipment operation to generate more accurate outputs regarding equipment servicing. As such, by implementing language models using various operations and processes described herein, building management and equipment servicing systems can take advantage of the causal/semantic associations between the unstructured data and the data relating to equipment operation, and the language models can allow these systems to more efficiently extract these relationships in order to more accurately predict targeted, useful information for servicing applications at inference-time/runtime. While various implementations are described as being implemented using generative AI models such as transformers and/or generative adversarial networks (GANs), in some embodiments, various features described herein can be implemented using non-generative AI models or even without using AI/machine learning, and all such modifications fall within the scope of the present disclosure.

FIG. 1 depicts an example of a system 100. The system 100 can implement various operations for configuring (e.g., training, updating, modifying, transfer learning, fine-tuning, etc.) and/or operating various AI and/or ML systems, such as neural networks of LLMs or other generative AI systems. The system 100 can be used to implement various generative AI-based building equipment servicing operations.

For example, the system 100 can be implemented for operations associated with any of a variety of building management systems (BMSs) or equipment or components thereof. A BMS can include a system of devices that can control, monitor, and manage equipment in or around a building or building area. The BMS can include, for example, a HVAC system, a security system, a lighting system, a fire alerting system, any other system that is capable of managing building functions or devices, or any combination thereof. The BMS can include or be coupled with items of equipment, for example and without limitation, such as heaters, chillers, boilers, air handling units, sensors, actuators, refrigeration systems, fans, blowers, heat exchangers, energy storage devices, condensers, valves, or various combinations thereof.

The items of equipment can operate in accordance with various qualitative and quantitative parameters, variables, setpoints, and/or thresholds or other criteria, for example. In some instances, the system 100 and/or the items of equipment can include or be coupled with one or more controllers for controlling parameters of the items of equipment, such as to receive control commands for controlling operation of the items of equipment via one or more wired, wireless, and/or user interfaces of controller.

Various components of the system 100 or portions thereof can be implemented by one or more processors coupled with or more memory devices (memory). The processors can be a general purpose or specific purpose processors, an application specific integrated circuit (ASIC), one or more field programmable gate arrays (FPGAs), a group of processing components, or other suitable processing components. The processors may be configured to execute computer code and/or instructions stored in the memories or received from other computer readable media (e.g., CDROM, network storage, a remote server, etc.). The processors can be configured in various computer architectures, such as graphics processing units (GPUs), distributed computing architectures, cloud server architectures, client-server architectures, or various combinations thereof. One or more first processors can be implemented by a first device, such as an edge device, and one or more second processors can be implemented by a second device, such as a server or other device that is communicatively coupled with the first device and may have greater processor and/or memory resources.

The memories can include one or more devices (e.g., memory units, memory devices, storage devices, etc.) for storing data and/or computer code for completing and/or facilitating the various processes described in the present disclosure. The memories can include random access memory (RAM), read-only memory (ROM), hard drive storage, temporary storage, non-volatile memory, flash memory, optical memory, or any other suitable memory for storing software objects and/or computer instructions. The memories can include database components, object code components, script components, or any other type of information structure for supporting the various activities and information structures described in the present disclosure. The memories can be communicably connected to the processors and can include computer code for executing (e.g., by the processors) one or more processes described herein.

The system 100 can include or be coupled with one or more first models 104. The first model 104 can include one or more neural networks, including neural networks configured as generative models. For example, the first model 104 can predict or generate new data (e.g., artificial data; synthetic data; data not explicitly represented in data used for configuring the first model 104). The first model 104 can generate any of a variety of modalities of data, such as text, speech, audio, images, and/or video data. The neural network can include a plurality of nodes, which may be arranged in layers for providing outputs of one or more nodes of one layer as inputs to one or more nodes of another layer. The neural network can include one or more input layers, one or more hidden layers, and one or more output layers. Each node can include or be associated with parameters such as weights, biases, and/or thresholds, representing how the node can perform computations to process inputs to generate outputs. The parameters of the nodes can be configured by various learning or training operations, such as unsupervised learning, weakly supervised learning, semi-supervised learning, or supervised learning.

The first model 104 can include, for example and without limitation, one or more language models, LLMs, attention-based neural networks, transformer-based neural networks, generative pretrained transformer (GPT) models, bidirectional encoder representations from transformers (BERT) models, encoder/decoder models, sequence to sequence models, autoencoder models, GANs, convolutional neural networks (CNNs), recurrent neural networks (RNNs), diffusion models (e.g., denoising diffusion probabilistic models (DDPMs)), or various combinations thereof. The LLM can include a pretrained generative transformer model. The data that LLM processes or receives as an input can include unstructured data conforming to different predetermined formats and/or not conforming to a predetermined format. The generative LLM can be configured to generate a digital twin from the unstructured data.

For example, the first model 104 can include at least one GPT model. The GPT model can receive an input sequence, and can parse the input sequence to determine a sequence of tokens (e.g., words or other semantic units of the input sequence, such as by using Byte Pair Encoding tokenization). The GPT model can include or be coupled with a vocabulary of tokens, which can be represented as a one-hot encoding vector, where each token of the vocabulary has a corresponding index in the encoding vector; as such, the GPT model can convert the input sequence into a modified input sequence, such as by applying an embedding matrix to the token tokens of the input sequence (e.g., using a neural network embedding function), and/or applying positional encoding (e.g., sin-cosine positional encoding) to the tokens of the input sequence. The GPT model can process the modified input sequence to determine a next token in the sequence (e.g., to append to the end of the sequence), such as by determining probability scores indicating the likelihood of one or more candidate tokens being the next token, and selecting the next token according to the probability scores (e.g., selecting the candidate token having the highest probability scores as the next token). For example, the GPT model can apply various attention and/or transformer based operations or networks to the modified input sequence to identify relationships between tokens for detecting the next token to form the output sequence.

The first model 104 can include at least one diffusion model, which can be used to generate image and/or video data. For example, the diffusional model can include a denoising neural network and/or a denoising diffusion probabilistic model neural network. The denoising neural network can be configured by applying noise to one or more training data elements (e.g., images, video frames) to generate noised data, providing the noised data as input to a candidate denoising neural network, causing the candidate denoising neural network to modify the noised data according to a denoising schedule, evaluating a convergence condition based on comparing the modified noised data with the training data instances, and modifying the candidate denoising neural network according to the convergence condition (e.g., modifying weights and/or biases of one or more layers of the neural network). In some implementations, the first model 104 includes a plurality of generative models, such as GPT and diffusion models, that can be trained separately or jointly to facilitate generating multi-modal outputs, such as technical documents (e.g., service guides) that include both text and image/video information.

In some implementations, the first model 104 can be configured using various unsupervised and/or supervised training operations. The first model 104 can be configured using training data from various domain-agnostic and/or domain-specific data sources, including but not limited to various forms of text, speech, audio, image, and/or video data, or various combinations thereof. The training data can include a plurality of training data elements (e.g., training data instances). Each training data element can be arranged in structured or unstructured formats; for example, the training data element can include an example output mapped to an example input, such as a query representing a service request or one or more portions of a service request, and a response representing data provided responsive to the query. The training data can include data that is not separated into input and output subsets (e.g., for configuring the first model 104 to perform clustering, classification, or other unsupervised ML operations). The training data can include human-labeled information, including but not limited to feedback regarding outputs of the models 104, 116. This can allow the system 100 to generate more human-like outputs.

In some implementations, the training data includes data relating to building management systems. For example, the training data can include examples of HVAC-R data, such as operating manuals, technical data sheets, configuration settings, operating setpoints, diagnostic guides, troubleshooting guides, user reports, technician reports. In some implementations, the training data used to configure the first model 104 includes at least some publicly accessible data, such as data retrievable via the Internet.

Referring further to FIG. 1, the system 100 can configure the first model 104 to determine one or more second models 116. For example, the system 100 can include a model updater 108 that configures (e.g., trains, updates, modifies, fine-tunes, etc.) the first model 104 to determine the one or more second models 116. In some implementations, the second model 116 can be used to provide application-specific outputs, such as outputs having greater precision, accuracy, or other metrics, relative to the first model, for targeted applications.

The second model 116 can be similar to the first model 104. For example, the second model 116 can have a similar or identical backbone or neural network architecture as the first model 104. In some implementations, the first model 104 and the second model 116 each include generative AI machine learning models, such as LLMs (e.g., GPT-based LLMs) and/or diffusion models. The second model 116 can be configured using processes analogous to those described for configuring the first model 104.

In some implementations, the model updater 108 can perform operations on at least one of the first model 104 or the second model 116 via one or more interfaces, such as application programming interfaces (APIs). For example, the models 104, 116 can be operated and maintained by one or more systems separate from the system 100. The model updater 108 can provide training data to the first model 104, via the API, to determine the second model 116 based on the first model 104 and the training data. The model updater 108 can control various training parameters or hyperparameters (e.g., learning rates, etc.) by providing instructions via the API to manage configuring the second model 116 using the first model 104.

The model updater 108 can determine the second model 116 using data from one or more data sources 112. For example, the system 100 can determine the second model 116 by modifying the first model 104 using data from the one or more data sources 112. The data sources 112 can include or be coupled with any of a variety of integrated or disparate databases, data warehouses, digital twin data structures (e.g., digital twins of items of equipment or building management systems or portions thereof), data lakes, data repositories, documentation records, or various combinations thereof. In some implementations, the data sources 112 include HVAC-R data in any of text, speech, audio, image, or video data, or various combinations thereof, such as data associated with HVAC-R components and procedures including but not limited to installation, operation, configuration, repair, servicing, diagnostics, and/or troubleshooting of HVAC-R components and systems. Various data described below with reference to data sources 112 may be provided in the same or different data elements, and may be updated at various points. The data sources 112 can include or be coupled with items of equipment (e.g., where the items of equipment output data for the data sources 112, such as sensor data, etc.). The data sources 112 can include various online and/or social media sources, such as blog posts or data submitted to applications maintained by entities that manage the buildings. The system 100 can determine relations between data from different sources, such as by using timeseries information and identifiers of the sites or buildings at which items of equipment are present to detect relationships between various different data relating to the items of equipment (e.g., to train the models 104, 116 using both timeseries data (e.g., sensor data; outputs of algorithms or models, etc.) regarding a given item of equipment and freeform natural language reports regarding the given item of equipment).

The data sources 112 can include unstructured data or structured data (e.g., data that is labeled with or assigned to one or more predetermined fields or identifiers). For example, using the first model 104 and/or second model 116 to process the data can allow the system 100 to extract useful information from data in a variety of formats, including unstructured/freeform formats, which can allow service technicians to input information in less burdensome formats. The data can be of any of a plurality of formats (e.g., text, speech, audio, image, video, etc.), including multi-modal formats. For example, the data may be received from service technicians in forms such as text (e.g., laptop/desktop or mobile application text entry), audio, and/or video (e.g., dictating findings while capturing video).

The data sources 112 can include engineering data regarding one or more items of equipment. The engineering data can include manuals, such as installation manuals, instruction manuals, or operating procedure guides. The engineering data can include specifications or other information regarding operation of items of equipment. The engineering data can include engineering drawings, process flow diagrams, refrigeration cycle parameters (e.g., temperatures, pressures), or various other information relating to structures and functions of items of equipment.

In some implementations, the data sources 112 can include operational data regarding one or more items of equipment. The operational data can represent detected information regarding items of equipment, such as sensor data, logged data, user reports, or technician reports. The operational data can include, for example, service tickets generated responsive to requests for service, work orders, data from digital twin data structures maintained by an entity of the item of equipment, outputs or other information from equipment operation models (e.g., chiller vibration models), or various combinations thereof. Logged data, user reports, service tickets, billing records, time sheets, and various other such data can provide temporal information, such as how long service operations may take, or durations of time between service operations, which can allow the system 100 to predict resources to use for performing service as well as when to request service. The data sources 112 can include telemetry data or point data. For example, data from equipment of a building can be streamed, sent, or transmitted to the model updater 108 or any other building platform, controller, gateway, or collector. The data can be measured temperature, humidity, pressure, or other environmental conditions for a data point. The data can be control data of a control point, e.g., a value of a fan speed, a value of a temperature setpoint, a value of a water setpoint, etc.

The data sources 112 can include, for instance, warranty data. The warranty data can include warranty documents or agreements that indicate conditions under which various entities associated with items of equipment are to provide service, repair, or other actions corresponding to items of equipment, such as actions corresponding to service requests.

The data sources 112 can include service data. The service data can include data from any of various service providers, such as service reports. The service data can indicate service procedures performed, including associated service procedures with initial service requests and/or sensor data related conditions to trigger service and/or sensor data measured during service processes.

In some implementations, the data sources 112 can include parts data, including but not limited to parts usage and sales data. For example, the data sources 112 can indicate various parts associated with installation or repair of items of equipment. The data sources 112 can indicate tools for performing service and/or installing parts.

The system 100 can include, with the data of the data sources 112, labels to facilitate cross-reference between items of data that may relate to common items of equipment, sites, service technicians, customers, or various combinations thereof. For example, data from disparate sources may be labeled with time data, which can allow the system 100 (e.g., by configuring the models 104, 116) to increase a likelihood of associating information from the disparate sources due to the information being detected or recorded (e.g., as service reports) at the same time or near in time.

For example, the data sources 112 can include data that can be particular to specific or similar items of equipment, buildings, equipment configurations, environmental states, or various combinations thereof. In some implementations, the data includes labels or identifiers of such information, such as to indicate locations, weather conditions, timing information, uses of the items of equipment or the buildings or sites at which the items of equipment are present, etc. This can enable the models 104, 116 to detect patterns of usage (e.g., spikes; troughs; seasonal or other temporal patterns) or other information that may be useful for determining causes of issues or causes of service requests, or predict future issues, such as to allow the models 104, 116 to be trained using information indicative of causes of issues across multiple items of equipment (which may have the same or similar causes even if the data regarding the items of equipment is not identical). For example, an item of equipment may be at a site that is a museum; by relating site usage or occupancy data with data regarding the item of equipment, such as sensor data and service reports, the system 100 can configure the models 104, 116 to determine a high likelihood of issues occurring before events associated with high usage (e.g., gala, major exhibit opening), and can generate recommendations to perform diagnostics or servicing prior to the events.

The data sources 112 can include building information model (BIM) or industry foundation classes (IFC) data. For example, the data sources 112 can include data that provides spatial data of a building, e.g., indications of rooms, floors, buildings, etc. The data sources can include spatial context data in a variety of formats, e.g., BIM, IFC, BACnet, Haystack, LonMark, Modbus, etc. The data sources 112 can include external data. For example, the data sources 112 can include an external digital twin run by an external system or run for a different building. The external data sources can include public or private data sources, e.g., satellite images of buildings, zoning information of buildings, street maps (e.g., city, county, or state maps), weather forecast sources, etc.

Referring further to FIG. 1, the model updater 108 can perform various machine learning model configuration/training operations to determine the second models 116 using the data from the data sources 112. For example, the model updater 108 can perform various updating, optimization, retraining, reconfiguration, fine-tuning, or transfer learning operations, or various combinations thereof, to determine the second models 116. The model updater 108 can configure the second models 116, using the data sources 112, to generate outputs (e.g., completions) in response to receiving inputs (e.g., prompts), where the inputs and outputs can be analogous to data of the data sources 112.

For example, the model updater 108 can identify one or more parameters (e.g., weights and/or biases) of one or more layers of the first model 104, and maintain (e.g., freeze, maintain as the identified values while updating) the values of the one or more parameters of the one or more layers. In some implementations, the model updater 108 can modify the one or more layers, such as to add, remove, or change an output layer of the one or more layers, or to not maintain the values of the one or more parameters. The model updater 108 can select at least a subset of the identified one or parameters to maintain according to various criteria, such as user input or other instructions indicative of an extent to which the first model 104 is to be modified to determine the second model 116. In some implementations, the model updater 108 can modify the first model 104 so that an output layer of the first model 104 corresponds to output to be determined for applications 120.

Responsive to selecting the one or more parameters to maintain, the model updater 108 can apply, as input to the second model 116 (e.g., to a candidate second model 116, such as the modified first model 104, such as the first model 104 having the identified parameters maintained as the identified values), training data from the data sources 112. For example, the model updater 108 can apply the training data as input to the second model 116 to cause the second model 116 to generate one or more candidate outputs.

The model updater 108 can evaluate a convergence condition to modify the candidate second model 116 based at least on the one or more candidate outputs and the training data applied as input to the candidate second model 116. For example, the model updater 108 can evaluate an objective function of the convergence condition, such as a loss function (e.g., L1 loss, L2 loss, root mean square error, cross-entropy or log loss, etc.) based on the one or more candidate outputs and the training data; this evaluation can indicate how closely the candidate outputs generated by the candidate second model 116 correspond to the ground truth represented by the training data. The model updater 108 can use any of a variety of optimization algorithms (e.g., gradient descent, stochastic descent, Adam optimization, etc.) to modify one or more parameters (e.g., weights or biases of the layer(s) of the candidate second model 116 that are not frozen) of the candidate second model 116 according to the evaluation of the objective function. In some implementations, the model updater 108 can use various hyperparameters to evaluate the convergence condition and/or perform the configuration of the candidate second model 116 to determine the second model 116, including but not limited to hyperparameters such as learning rates, numbers of iterations or epochs of training, etc.

As described further herein with respect to applications 120, in some implementations, the model updater 108 can select the training data from the data of the data sources 112 to apply as the input based at least on a particular application of the plurality of applications 120 for which the second model 116 is to be used for. For example, the model updater 108 can select data from the parts data source 112 for the product recommendation generator application 120, or select various combinations of data from the data sources 112 (e.g., engineering data, operational data, and service data) for the service recommendation generator application 120. The model updater 108 can apply various combinations of data from various data sources 112 to facilitate configuring the second model 116 for one or more applications 120.

In some implementations, the system 100 can perform at least one of conditioning, classifier-based guidance, or classifier-free guidance to configure the second model 116 using the data from the data sources 112. For example, the system 100 can use classifiers associated with the data, such as identifiers of the item of equipment, a type of the item of equipment, a type of entity operating the item of equipment, a site at which the item of equipment is provided, or a history of issues at the site, to condition the training of the second model 116. For example, the system 100 combine (e.g., concatenate) various such classifiers with the data for inputting to the second model 116 during training, for at least a subset of the data used to configure the second model 116, which can enable the second model 116 to be responsive to analogous information for runtime/inference time operations.

Referring further to FIG. 1, the system 100 can use outputs of the one or more second models 116 to implement one or more applications 120. For example, the second models 116, having been configured using data from the data sources 112, can be capable of precisely generating outputs that represent useful, timely, and/or real-time information for the applications 120. In some implementations, each application 120 is coupled with a corresponding second model 116 that is specifically configured to generate outputs for use by the application 120. Various applications 120 can be coupled with one another, such as to provide outputs from a first application 120 as inputs or portions of inputs to a second application 120.

The applications 120 can include any of a variety of desktop, web-based/browser-based, or mobile applications. For example, the applications 120 can be implemented by enterprise management software systems, employee or other user applications (e.g., applications that relate to BMS functionality such as temperature control, user preferences, conference room scheduling, etc.), equipment portals that provide data regarding items of equipment, or various combinations thereof. The applications 120 can include user interfaces, wizards, checklists, conversational interfaces, chatbots, configuration tools, or various combinations thereof. The applications 120 can receive an input, such as a prompt (e.g., from a user), provide the prompt to the second model 116 to cause the second model 116 to generate an output, such as a completion in response to the prompt, and present an indication of the output. The applications 120 can receive inputs and/or present outputs in any of a variety of presentation modalities, such as text, speech, audio, image, and/or video modalities. For example, the applications 120 can receive unstructured or freeform inputs from a user, such as a service technician, and generate reports in a standardized format, such as a customer-specific format. This can allow, for example, technicians to automatically, and flexibly, generate customer-ready reports after service visits without requiring strict input by the technician or manually sitting down and writing reports; to receive inputs as dictations in order to generate reports; to receive inputs in any form or a variety of forms, and use the second model 116 (which can be trained to cross-reference metadata in different portions of inputs and relate together data elements) to generate output reports (e.g., the second model 116, having been configured with data that includes time information, can use timestamps of input from dictation and timestamps of when an image is taken, and place the image in the report in a target position or label based on time correlation).

In some implementations, the applications 120 include at least one virtual assistant (e.g., virtual assistance for technician services) application 120. The virtual assistant application can provide various services to support technician operations, such as presenting information from service requests, receiving queries regarding actions to perform to service items of equipment, and presenting responses indicating actions to perform to service items of equipment. The virtual assistant application can receive information regarding an item of equipment to be serviced, such as sensor data, text descriptions, or camera images, and process the received information using the second model 116 to generate corresponding responses.

For example, the virtual assistant application 120 can be implemented in a UI/UX wizard configuration, such as to provide a sequence of requests for information from the user (the sequence may include requests that are at least one of predetermined or dynamically generated responsive to inputs from the user for previous requests). For example, the virtual assistant application 120 can provide one or more requests for users such as service technicians, facility managers, or other occupants, and provide the received responses to at least one of the second model 116 or a root cause detection function (e.g., algorithm, model, data structure mapping inputs to candidate causes, etc.) to determine a prediction of a cause of the issue of the item of equipment and/or solutions. The virtual assistant application 120 can use requests for information such as for unstructured text by which the user describes characteristics of the item of equipment relating to the issue; answers expected to correspond to different scenarios indicative of the issue; and/or image and/or video input (e.g., images of problems, equipment, spaces, etc. that can provide more context around the issue and/or configurations). For example, responsive to receiving a response via the virtual assistant application 120 indicating that the problem is with temperature in the space, the system 100 can request, via the virtual assistant application 120, information regarding HVAC-R equipment associated with the space, such as pictures of the space, an air handling unit, a chiller, or various combinations thereof.

The virtual assistant application 120 can include a plurality of applications 120 (e.g., variations of interfaces or customizations of interfaces) for a plurality of respective user types. For example, the virtual assistant application 120 can include a first application 120 for a customer user, and a second application 120 for a service technician user. The virtual assistant applications 120 can allow for updating and other communications between the first and second applications 120 as well as the second model 116. Using one or more of the first application 120 and the second application 120, the system 100 can manage continuous/real-time conversations for one or more users, and evaluate the users' engagement with the information provided (e.g., did the user, customer, service technician, etc., follow the provided steps for responding to the issue or performing service, did the user discontinue providing inputs to the virtual assistant application 120, etc.), such as to enable the system 100 to update the information generated by the second model 116 for the virtual assistant application 120 according to the engagement. In some implementations, the system 100 can use the second model 116 to detect sentiment of the user of the virtual assistant application 120, and update the second model 116 according to the detected sentiment, such as to improve the experience provided by the virtual assistant application 120.

The applications 120 can include at least one document writer application 120, such as a technical document writer. The document writer application 120 can facilitate preparing structured (e.g. form-based) and/or unstructured documentation, such as documentation associated with service requests. For example, the document writer application 120 can present a user interface corresponding to a template document to be prepared that is associated with at least one of a service request or the item of equipment for which the service request is generated, such as to present one or more predefined form sections or fields. The document writer application 120 can use inputs, such as prompts received from the users and/or technical data provided by the user regarding the item of equipment, such as sensor data, text descriptions, or camera images, to generate information to include in the documentation. For example, the document writer application 120 can provide the inputs to the second model 116 to cause the second model 116 to generate completions for text information to include in the fields of the documentation.

The applications 120 can include, in some implementations, at least one diagnostics and troubleshooting application 120. The diagnostics and troubleshooting application 120 can receive inputs including at least one of a service request or information regarding the item of equipment to be serviced, such as information identified by a service technician. The diagnostics and troubleshooting application 120 can provide the inputs to a corresponding second model 116 to cause the second model 116 to generate outputs such as indications of potential items to be checked regarding the item of equipment, modifications or fixes to make to perform the service, or values or ranges of values of parameters of the item of equipment that may be indicative of specific issues to for the service technician to address or repair.

The applications 120 can at least one service recommendation generator application 120. The service recommendation generator application 120 can receive inputs such as a service request or information regarding the item of equipment to be serviced, and provide the inputs to the second model 116 to cause the second model 116 to generate outputs for presenting service recommendations, such as actions to perform to address the service request.

In some implementations, the applications 120 can include a product recommendation generator application 120. The product recommendation generator application 120 can process inputs such as information regarding the item of equipment or the service request, using one or more second models 116 (e.g., models trained using parts data from the data sources 112), to determine a recommendation of a part or product to replace or otherwise use for repairing the item of equipment.

The applications 120 can include a control application. The control application can be a building control application that controls equipment of a building. For example, the control application can execute proportional integral control (PID) algorithms, extremum seeking control algorithms, model predictive control algorithms, etc. The control application can receive data of the data sources 112 as an input and output operating commands, control settings, or other pieces of information. The control application can execute on data of a digital twin to generate the output data. The control application can operate equipment of a building, for example, transmitting the operating commands or settings to the equipment to cause the equipment to operate according to the commands or settings.

The applications 120 can include an optimization application. The optimization application can receive data of the data sources 112 as an input. The optimization application can execute on data of a digital twin. The optimization application can run to determine energy consumption by the building and determine a strategy, control setting, or control schedule to reduce the energy consumption. The optimization application 120 can execute to participate in incentive based demand response programs, capacity market programs, frequency regulation programs, or any other program.

The applications 120 can include a maintenance application. The maintenance application can execute on the data sources 112 or a digital twin. The maintenance application can output maintenance recommendations, service recommendations, schedule servicing tickets, etc. The maintenance application can determine when to replace equipment, e.g., replace a chiller, replace a thermostat, etc. The maintenance application can determine when to service a piece of equipment, e.g., recharge a refrigerant system, flush a refrigerant system, clean a duct system, etc.

The applications 120 can include an alarm application. The alarm application can execute on the data sources 112 or a digital twin. The alarm application can detect faults, alarms, or decreased operating performance of the building or building equipment. The alarm application can analyze the data of the data sources 112 can detect that received data is out of a range, e.g., a flow rate is below a threshold indicating that a filter is clogged, a temperature sensor is reading an abnormally low value indicating that the sensor is not functioning property, etc. The alarm application 120 can receive fault data or fault codes from the building equipment.

Referring further to FIG. 1, the system 100 can include at least one feedback trainer 128 coupled with at least one feedback repository 124. The system 100 can use the feedback trainer 128 to increase the precision and/or accuracy of the outputs generated by the second models 116 according to feedback provided by users of the system 100 and/or the applications 120.

The feedback repository 124 can include feedback received from users regarding output presented by the applications 120. For example, for at least a subset of outputs presented by the applications 120, the applications 120 can present one or more user input elements for receiving feedback regarding the outputs. The user input elements can include, for example, indications of binary feedback regarding the outputs (e.g., good/bad feedback; feedback indicating the outputs do or do not meet the user's criteria, such as criteria regarding technical accuracy or precision); indications of multiple levels of feedback (e.g., scoring the outputs on a predetermined scale, such as a 1-5 scale or 1-10 scale); freeform feedback (e.g., text or audio feedback); or various combinations thereof.

The system 100 can store and/or maintain feedback in the feedback repository 124. In some implementations, the system 100 stores the feedback with one or more data elements associated with the feedback, including but not limited to the outputs for which the feedback was received, the second model(s) 116 used to generate the outputs, and/or input information used by the second models 116 to generate the outputs (e.g., service request information; information captured by the user regarding the item of equipment).

The feedback trainer 128 can update the one or more second models 116 using the feedback. The feedback trainer 128 can be similar to the model updater 108. In some implementations, the feedback trainer 128 is implemented by the model updater 108; for example, the model updater 108 can include or be coupled with the feedback trainer 128. The feedback trainer 128 can perform various configuration operations (e.g., retraining, fine-tuning, transfer learning, etc.) on the second models 116 using the feedback from feedback repository 124. In some implementations, the feedback trainer 128 identifies one or more first parameters of the second model 116 to maintain as having predetermined values (e.g., freeze the weights and/or biases of one or more first layers of the second model 116), and performs a training process, such as a fine tuning process, to configure parameters of one or more second parameters of the second model 116 using the feedback (e.g., one or more second layers of the second model 116, such as output layers or output heads of the second model 116).

In some implementations, the system 100 may not include and/or use the model updater 108 (or the feedback trainer 128) to determine the second models 116. For example, the system 100 can include or be coupled with an output processor (e.g., an output processor similar or identical to accuracy checker 316 described with reference to FIG. 3) that can evaluate and/or modify outputs from the first model 104 prior to operation of applications 120, including to perform any of various post-processing operations on the output from the first model 104. For example, the output processor can compare outputs of the first model 104 with data from data sources 112 to validate the outputs of the first model 104 and/or modify the outputs of the first model 104 (or output an error) responsive to the outputs not satisfying a validation condition.

Referring further to FIG. 1, the second model 116 can be coupled with one or more third models, functions, or algorithms for training/configuration and/or runtime operations.

The third models can include, for example and without limitation, any of various models relating to items of equipment, such as energy usage models, sustainability models, carbon models, air quality models, or occupant comfort models. For example, the second model 116 can be used to process unstructured information regarding items of equipment into predefined template formats compatible with various third models, such that outputs of the second model 116 can be provided as inputs to the third models; this can allow more accurate training of the third models, more training data to be generated for the third models, and/or more data available for use by the third models. The second model 116 can receive inputs from one or more third models, which can provide greater data to the second model 116 for processing.

The system 100 can be used to automate operations for scheduling, provisioning, and deploying service technicians and resources for service technicians to perform service operations. For example, the system 100 can use at least one of the first model 104 or the second model 116 to determine, based on processing information regarding service operations for items of equipment relative to completion criteria for the service operation, particular characteristics of service operations such as experience parameters of scheduled service technicians, identifiers of parts provided for the service operations, geographical data, types of customers, types of problems, or information content provided to the service technicians to facilitate the service operation, where such characteristics correspond to the completion criteria being satisfied (e.g., where such characteristics correspond to an increase in likelihood of the completion criteria being satisfied relative to other characteristics for service technicians, parts, information content, etc.). For example, the system 100 can determine, for a given item of equipment, particular parts to include on a truck to be sent to the site of the item of equipment. As such, the system 100, responsive to processing inputs at runtime such as service requests, can automatically and more accurately identify service technicians and parts to direct to the item of equipment for the service operations. The system 100 can use timing information to perform batch scheduling for multiple service operations and/or multiple technicians for the same or multiple service operations. The system 100 can perform batch scheduling for multiple trucks for multiple items of equipment, such as to schedule a first one or more parts having a greater likelihood for satisfying the completion criteria for a first item of equipment on a first truck, and a second one or more parts having a greater likelihood for satisfying the completion criteria for a second item of equipment on a second truck.

Figure 2:
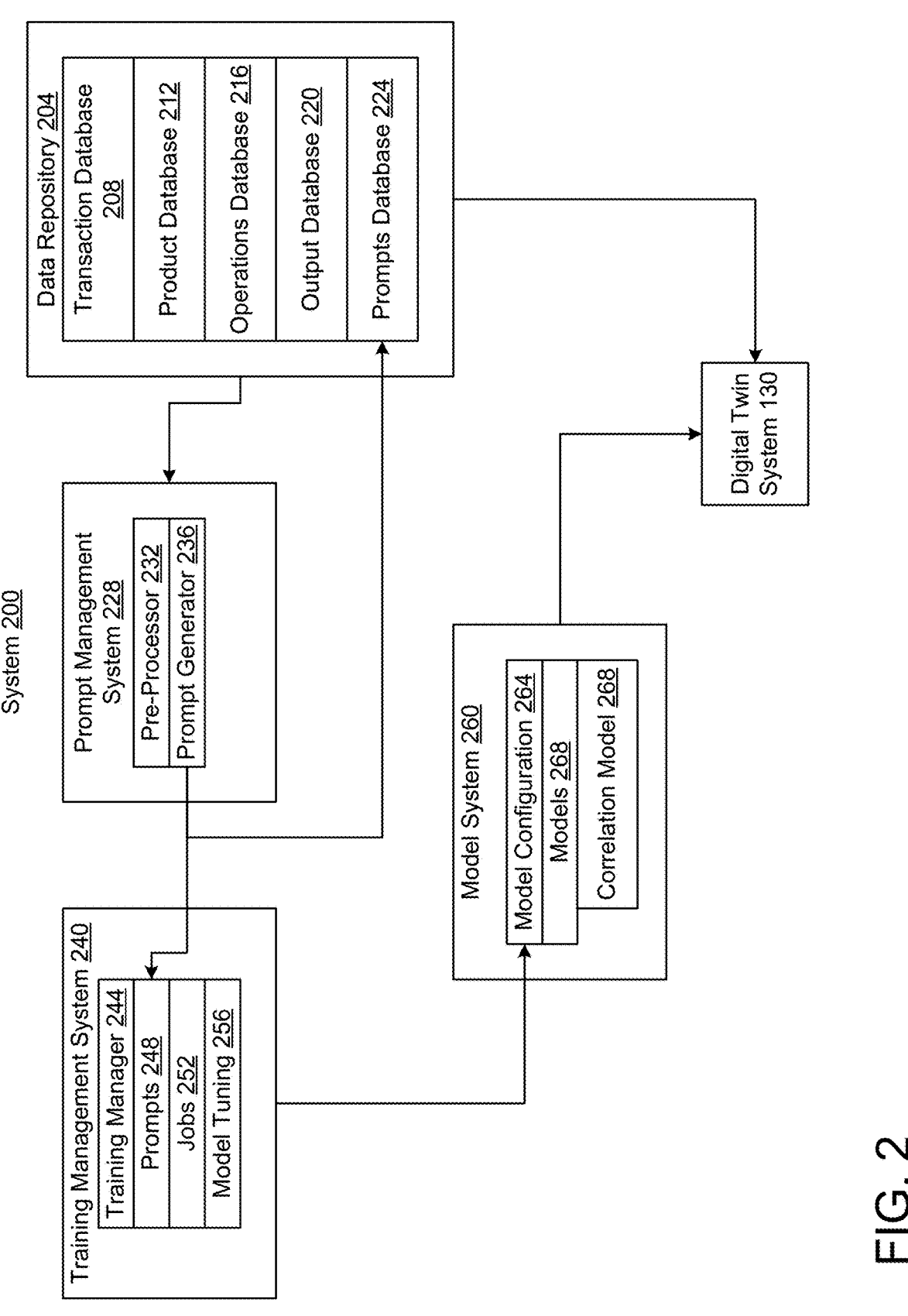
FIG. 2 is a block diagram of an example of a language model-based system for equipment servicing applications.

FIG. 2 depicts an example of a system 200. The system 200 can include one or more components or features of the system 100, such as any one or more of the first model 104, data sources 112, second model 116, applications 120, feedback repository 124, and/or feedback trainer 128. The system 200 can perform specific operations to enable generative AI applications for building managements systems and equipment servicing, such as various manners of processing input data into training data (e.g., tokenizing input data; forming input data into prompts and/or completions), and managing training and other machine learning model configuration processes. Various components of the system 200 can be implemented using one or more computer systems, which may be provided on the same or different processors (e.g., processors communicatively coupled via wired and/or wireless connections).

The system 200 can include at least one data repository 204, which can be similar to the data sources 112 described with reference to FIG. 1. For example, the data repository 204 can include a transaction database 208, which can be similar or identical to one or more of warranty data or service data of data sources 112. For example, the transaction database 208 can include data such as parts used for service transactions; sales data indicating various service transactions or other transactions regarding items of equipment; warranty and/or claims data regarding items of equipment; and service data.

The data repository 204 can include a product database 212, which can be similar or identical to the parts data of the data sources 112. The product database 212 can include, for example, data regarding products available from various vendors, specifications or parameters regarding products, and indications of products used for various service operations. The products database 212 can include data such as events or alarms associated with products; logs of product operation; and/or time series data regarding product operation, such as longitudinal data values of operation of products and/or building equipment.

The data repository 204 can include an operations database 216, which can be similar or identical to the operations data of the data sources 112. For example, the operations database 216 can include data such as manuals regarding parts, products, and/or items of equipment; customer service data; and or reports, such as operation or service logs.

In some implementations, the data repository 204 can include an output database 220, which can include data of outputs that may be generated by various machine learning models and/or algorithms. For example, the output database 220 can include values of pre-calculated predictions and/or insights, such as parameters regarding operation items of equipment, such as setpoints, changes in setpoints, flow rates, control schemes, identifications of error conditions, or various combinations thereof.

As depicted in FIG. 2, the system 200 can include a prompt management system 228. The prompt management system 228 can include one or more rules, heuristics, logic, policies, algorithms, functions, machine learning models, neural networks, scripts, or various combinations thereof to perform operations including processing data from data repository 204 into training data for configuring various machine learning models. For example, the prompt management system 228 can retrieve and/or receive data from the data repository 204, and determine training data elements that include examples of input and outputs for generation by machine learning models, such as a training data element that includes a prompt and a completion corresponding to the prompt, based on the data from the data repository 204.

In some implementations, the prompt management system 228 includes a pre-processor 232. The pre-processor 232 can perform various operations to prepare the data from the data repository 204 for prompt generation. For example, the pre-processor 232 can perform any of various filtering, compression, tokenizing, or combining (e.g., combining data from various databases of the data repository 204) operations.

The prompt management system 228 can include a prompt generator 236. The prompt generator 236 can generate, from data of the data repository 204, one or more training data elements that include a prompt and a completion corresponding to the prompt. In some implementations, the prompt generator 236 receives user input indicative of prompt and completion portions of data. For example, the user input can indicate template portions representing prompts of structured data, such as predefined fields or forms of documents, and corresponding completions provided for the documents. The user input can assign prompts to unstructured data. In some implementations, the prompt generator 236 automatically determines prompts and completions from data of the data repository 204, such as by using any of various natural language processing algorithms to detect prompts and completions from data. In some implementations, the system 200 does not identify distinct prompts and completions from data of the data repository 204.

Referring further to FIG. 2, the system 200 can include a training management system 240. The training management system 240 can include one or more rules, heuristics, logic, policies, algorithms, functions, machine learning models, neural networks, scripts, or various combinations thereof to perform operations including controlling training of machine learning models, including performing fine tuning and/or transfer learning operations.

The training management system 240 can include a training manager 244. The training manager 244 can incorporate features of at least one of the model updater 108 or the feedback trainer 128 described with reference to FIG. 1. For example, the training manager 244 can provide training data including a plurality of training data elements (e.g., prompts and corresponding completions) to the model system 260 as described further herein to facilitate training machine learning models.

In some implementations, the training management system 240 includes a prompts database 248. For example, the training management system 240 can store one or more training data elements from the prompt management system 228, such as to facilitate asynchronous and/or batched training processes.

The training manager 244 can control the training of machine learning models using information or instructions maintained in a model tuning database 256. For example, the training manager 244 can store, in the model tuning database 256, various parameters or hyperparameters for models and/or model training.

In some implementations, the training manager 244 stores a record of training operations in a jobs database 252. For example, the training manager 244 can maintain data such as a queue of training jobs, parameters or hyperparameters to be used for training jobs, or information regarding performance of training.

Referring further to FIG. 2, the system 200 can include at least one model system 260 (e.g., one or more language model systems). The model system 260 can include one or more rules, heuristics, logic, policies, algorithms, functions, machine learning models, neural networks, scripts, or various combinations thereof to perform operations including configuring one or more machine learning models 268 based on instructions from the training management system 240. In some implementations, the training management system 240 implements the model system 260. In some implementations, the training management system 240 can access the model system 260 using one or more APIs, such as to provide training data and/or instructions for configuring machine learning models 268 via the one or more APIs. The model system 260 can operate as a service layer for configuring the machine learning models 268 responsive to instructions from the training management system 240. The machine learning models 268 can be or include the first model 104 and/or second model 116 described with reference to FIG. 1.

The model system 260 can include a model configuration processor 264. The model configuration processor 264 can incorporate features of the model updater 108 and/or the feedback trainer 128 described with reference to FIG. 1. For example, the model configuration processor 264 can apply training data (e.g., prompts 248 and corresponding completions) to the machine learning models 268 to configure (e.g., train, modify, update, fine-tune, etc.) the machine learning models 268. The training manager 244 can control training by the model configuration processor 264 based on model tuning parameters in the model tuning database 256, such as to control various hyperparameters for training. In various implementations, the system 200 can use the training management system 240 to configure the machine learning models 268 in a similar manner as described with reference to the second model 116 of FIG. 1, such as to train the machine learning models 268 using any of various data or combinations of data from the data repository 204.

Figure 3:
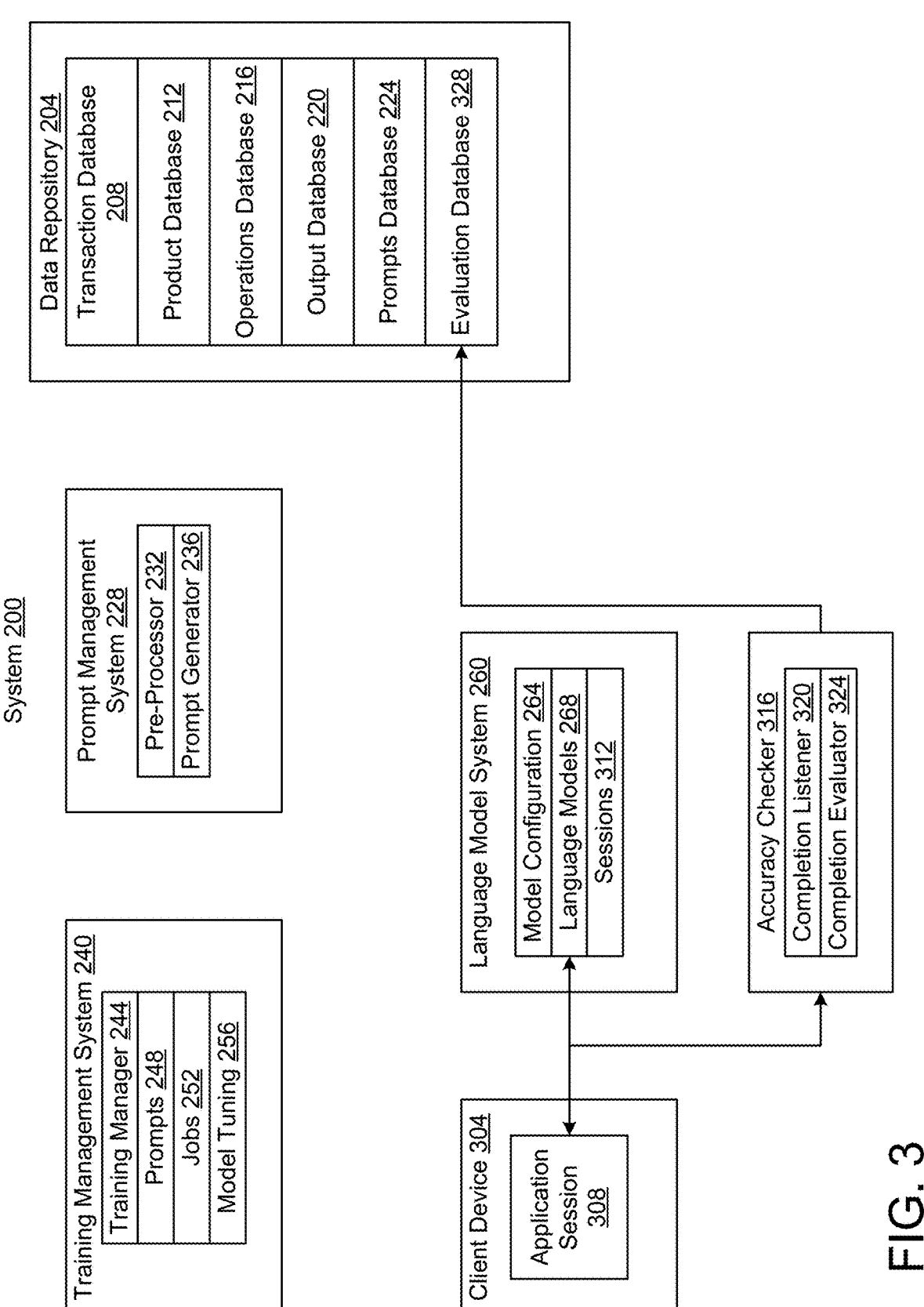
FIG. 3 is a block diagram of an example of the system of FIG. 2 including user application session components.

FIG. 3 depicts an example of the system 200, in which the system 200 can perform operations to implement at least one application session 308 for a client device 304. For example, responsive to configuring the machine learning models 268, the system 200 can generate data for presentation by the client device 304 (including generating data responsive to information received from the client device 304) using the at least one application session 308 and the one or more machine learning models 268.

The client device 304 can be a device of a user, such as a technician or building manager. The client device 304 can include any of various wireless or wired communication interfaces to communicate data with the model system 260, such as to provide requests to the model system 260 indicative of data for the machine learning models 268 to generate, and to receive outputs from the model system 260. The client device 304 can include various user input and output devices to facilitate receiving and presenting inputs and outputs.

In some implementations, the system 200 provides data to the client device 304 for the client device 304 to operate the at least one application session 308. The application session 308 can include a session corresponding to any of the applications 120 described with reference to FIG. 1. For example, the client device 304 can launch the application session 308 and provide an interface to request one or more prompts. Responsive to receiving the one or more prompts, the application session 308 can provide the one or more prompts as input to the machine learning model 268. The machine learning model 268 can process the input to generate a completion, and provide the completion to the application session 308 to present via the client device 304. In some implementations, the application session 308 can iteratively generate completions using the machine learning models 268. For example, the machine learning models 268 can receive a first prompt from the application session 308, determine a first completion based on the first prompt and provide the first completion to the application session 308, receive a second prompt from the application 308, determine a second completion based on the second prompt (which may include at least one of the first prompt or the first completion concatenated to the second prompt), and provide the second completion to the application session 308.

In some implementations, the model system 260 includes at least one sessions database 312. The sessions database 312 can maintain records of application session 308 implemented by client devices 304. For example, the sessions database 312 can include records of prompts provided to the machine learning models 268 and completions generated by the machine learning models 268. As described further with reference to FIG. 4, the system 200 can use the data in the sessions database 312 to fine-tune or otherwise update the machine learning models 268.

In some implementations, the system 200 includes an accuracy checker 316. The accuracy checker 316 can include one or more rules, heuristics, logic, policies, algorithms, functions, machine learning models, neural networks, scripts, or various combinations thereof to perform operations including evaluating performance criteria regarding the completions determined by the model system 260. For example, the accuracy checker 316 can include at least one completion listener 320. The completion listener 320 can receive the completions determined by the model system 260 (e.g., responsive to the completions being generated by the machine learning model 268 and/or by retrieving the completions from the sessions database 312).

The accuracy checker 316 can include at least one completion evaluator 324. The completion evaluator 324 can evaluate the completions (e.g., as received or retrieved by the completion listener 320) according to various criteria. In some implementations, the completion evaluator 324 evaluates the completions by comparing the completions with corresponding data from the data repository 204. For example, the completion evaluator 324 can identify data of the data repository 204 having similar text as the prompts and/or completions (e.g., using any of various natural language processing algorithms), and determine whether the data of the completions is within a range of expected data represented by the data of the data repository 204.

In some implementations, the accuracy checker 316 can store an output from evaluating the completion (e.g., an indication of whether the completion satisfies the criteria) in an evaluation database 328. For example, the accuracy checker 316 can assign the output (which may indicate at least one of a binary indication of whether the completion satisfied the criteria or an indication of a portion of the completion that did not satisfy the criteria) to the completion for storage in the evaluation database 328, which can facilitate further training of the machine learning models 268 using the completions and output.

Figure 4:
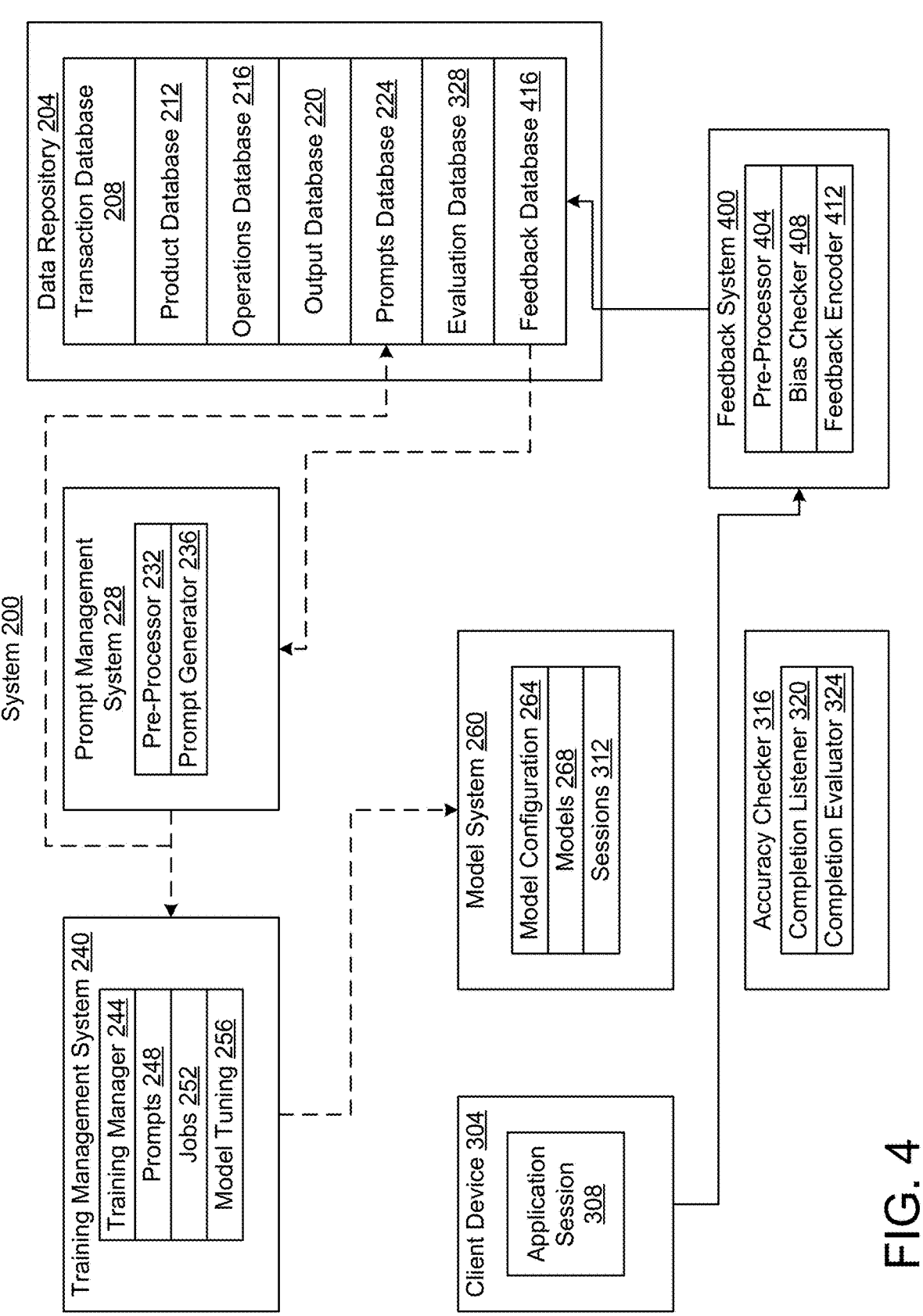
FIG. 4 is a block diagram of an example of the system of FIG. 2 including feedback training components.

FIG. 4 depicts an example of the system 200 that includes a feedback system 400, such as a feedback aggregator. The feedback system 400 can include one or more rules, heuristics, logic, policies, algorithms, functions, machine learning models, neural networks, scripts, or various combinations thereof to perform operations including preparing data for updating and/or updating the machine learning models 268 using feedback corresponding to the application sessions 308, such as feedback received as user input associated with outputs presented by the application sessions 308. The feedback system 400 can incorporate features of the feedback repository 124 and/or feedback trainer 128 described with reference to FIG. 1.

The feedback system 400 can receive feedback (e.g., from the client device 304) in various formats. For example, the feedback can include any of text, speech, audio, image, and/or video data. The feedback can be associated (e.g., in a data structure generated by the application session 308) with the outputs of the machine learning models 268 for which the feedback is provided. The feedback can be received or extracted from various forms of data, including external data sources such as manuals, service reports, or Wikipedia-type documentation.

In some implementations, the feedback system 400 includes a pre-processor 404. The pre-processor 404 can perform any of various operations to modify the feedback for further processing. For example, the pre-processor 404 can incorporate features of, or be implemented by, the pre-processor 232, such as to perform operations including filtering, compression, tokenizing, or translation operations (e.g., translation into a common language of the data of the data repository 204).

The feedback system 400 can include a bias checker 408. The bias checker 408 can evaluate the feedback using various bias criteria, and control inclusion of the feedback in a feedback database 416 (e.g., a feedback database 416 of the data repository 204 as depicted in FIG. 4) according to the evaluation. The bias criteria can include, for example and without limitation, criteria regarding qualitative and/or quantitative differences between a range or statistic measure of the feedback relative to actual, expected, or validated values.

The feedback system 400 can include a feedback encoder 412. The feedback encoder 412 can process the feedback (e.g., responsive to bias checking by the bias checker 408) for inclusion in the feedback database 416. For example, the feedback encoder 412 can encode the feedback as values corresponding to outputs scoring determined by the model system 260 while generating completions (e.g., where the feedback indicates that the completion presented via the application session 308 was acceptable, the feedback encoder 412 can encode the feedback by associating the feedback with the completion and assigning a relatively high score to the completion).

As indicated by the dashed arrows in FIG. 4, the feedback can be used by the prompt management system 228 and training management system 240 to further update one or more machine learning models 268. For example, the prompt management system 228 can retrieve at least one feedback (and corresponding prompt and completion data) from the feedback database 416, and process the at least one feedback to determine a feedback prompt and feedback completion to provide to the training management system 240 (e.g., using pre-processor 232 and/or prompt generator 236, and assigning a score corresponding to the feedback to the feedback completion). The training manager 244 can provide instructions to the model system 260 to update the machine learning models 268 using the feedback prompt and the feedback completion, such as to perform a fine-tuning process using the feedback prompt and the feedback completion. In some implementations, the training management system 240 performs a batch process of feedback-based fine tuning by using the prompt management system 228 to generate a plurality of feedback prompts and a plurality of feedback completion, and providing instructions to the model system 260 to perform the fine-tuning process using the plurality of feedback prompts and the plurality of feedback completions.

Figure 5:
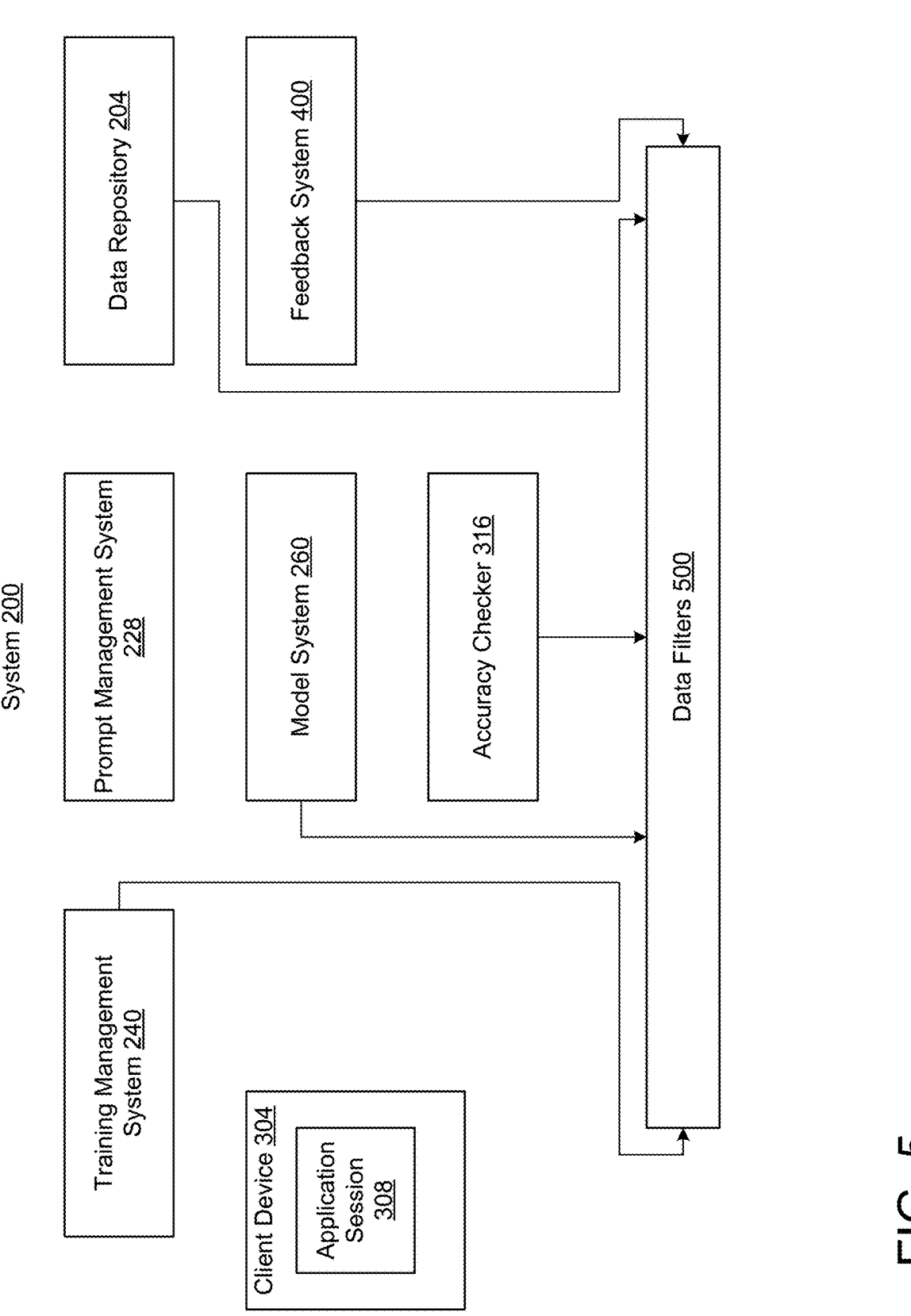
FIG. 5 is a block diagram of an example of the system of FIG. 2 including data filters.

FIG. 5 depicts an example of the system 200, where the system 200 can include one or more data filters 500 (e.g., data validators). The data filters 500 can include any one or more rules, heuristics, logic, policies, algorithms, functions, machine learning models, neural networks, scripts, or various combinations thereof to perform operations including modifying data processed by the system 200 and/or triggering alerts responsive to the data not satisfying corresponding criteria, such as thresholds for values of data. Various data filtering processes described with reference to FIG. 5 (as well as FIGS. 6 and 7) can enable the system 200 to implement timely operations for improving the precision and/or accuracy of completions or other information generated by the system 200 (e.g., including improving the accuracy of feedback data used for fine-tuning the machine learning models 268). The data filters 500 can allow for interactions between various algorithms, models, and computational processes.

For example, the data filters 500 can be used to evaluate data relative to thresholds relating to data including, for example and without limitation, acceptable data ranges, setpoints, temperatures, pressures, flow rates (e.g., mass flow rates), or vibration rates for an item of equipment. The threshold can include any of various thresholds, such as one or more of minimum, maximum, absolute, relative, fixed band, and/or floating band thresholds.

The data filters 500 can enable the system 200 to detect when data, such as prompts, completions, or other inputs and/or outputs of the system 200, collide with thresholds that represent realistic behavior or operation or other limits of items of equipment. For example, the thresholds of the data filters 500 can correspond to values of data that are within feasible or recommended operating ranges. In some implementations, the system 200 determines or receives the thresholds using models or simulations of items of equipment, such as plant or equipment simulators, chiller models, HVAC-R models, refrigeration cycle models, etc. The system 200 can receive the thresholds as user input (e.g., from experts, technicians, or other users). The thresholds of the data filters 500 can be based on information from various data sources. The thresholds can include, for example and without limitation, thresholds based on information such as equipment limitations, safety margins, physics, expert teaching, etc. For example, the data filters 500 can include thresholds determined from various models, functions, or data structures (e.g., tables) representing physical properties and processes, such as physics of psychometrics, thermodynamics, and/or fluid dynamics information.

The system 200 can determine the thresholds using feedback system 400 and/or the client device 304, such as by providing a request for feedback that includes a request for a corresponding threshold associated with the completion and/or prompt presented by the application session 308. For example, the system 200 can use the feedback to identify realistic thresholds, such as by using feedback regarding data generated by the machine learning models 268 for ranges, setpoints, and/or start-up or operating sequences regarding items of equipment (and which can thus be validated by human experts). In some implementations, the system 200 selectively requests feedback indicative of thresholds based on an identifier of a user of the application session 308, such as to selectively request feedback from users having predetermined levels of expertise and/or assign weights to feedback according to criteria such as levels of expertise.

In some implementations, one or more data filters 500 correspond to a given setup. For example, the setup can represent a configuration of a corresponding item of equipment (e.g., configuration of a chiller, etc.). The data filters 500 can represent various thresholds or conditions with respect to values for the configuration, such as feasible or recommendation operating ranges for the values. In some implementations, one or more data filters 500 correspond to a given situation. For example, the situation can represent at least one of an operating mode or a condition of a corresponding item of equipment.

FIG. 5 depicts some examples of data (e.g., inputs, outputs, and/or data communicated between nodes of machine learning models 268) to which the data filters 500 can be applied to evaluate data processed by the system 200 including various inputs and outputs of the system 200 and components thereof. This can include, for example and without limitation, filtering data such as data communicated between one or more of the data repository 204, prompt management system 228, training management system 240, model system 260, client device 304, accuracy checker 316, and/or feedback system 400. For example, the data filters 500 (as well as validation system 600 described with reference to FIG. 6 and/or expert filter collision system 700 described with reference to FIG. 7) can receive data outputted from a source (e.g., source component) of the system 200 for receipt by a destination (e.g., destination component) of the system 200, and filter, modify, or otherwise process the outputted data prior to the system 200 providing the outputted data to the destination. The sources and destinations can include any of various combinations of components and systems of the system 200.

The system 200 can perform various actions responsive to the processing of data by the data filters 500. In some implementations, the system 200 can pass data to a destination without modifying the data (e.g., retaining a value of the data prior to evaluation by the data filter 500) responsive to the data satisfying the criteria of the respective data filter(s) 500. In some implementations, the system 200 can at least one of (i) modify the data or (ii) output an alert responsive to the data not satisfying the criteria of the respective data filter(s) 500. For example, the system 200 can modify the data by modifying one or more values of the data to be within the criteria of the data filters 500.

In some implementations, the system 200 modifies the data by causing the machine learning models 268 to regenerate the completion corresponding to the data (e.g., for up to a predetermined threshold number of regeneration attempts before triggering the alert). This can enable the data filters 500 and the system 200 selectively trigger alerts responsive to determining that the data (e.g., the collision between the data and the thresholds of the data filters 500) may not be repairable by the machine learning model 268 aspects of the system 200.

The system 200 can output the alert to the client device 304. The system 200 can assign a flag corresponding to the alert to at least one of the prompt (e.g., in prompts database 224) or the completion having the data that triggered the alert.

Figure 6:
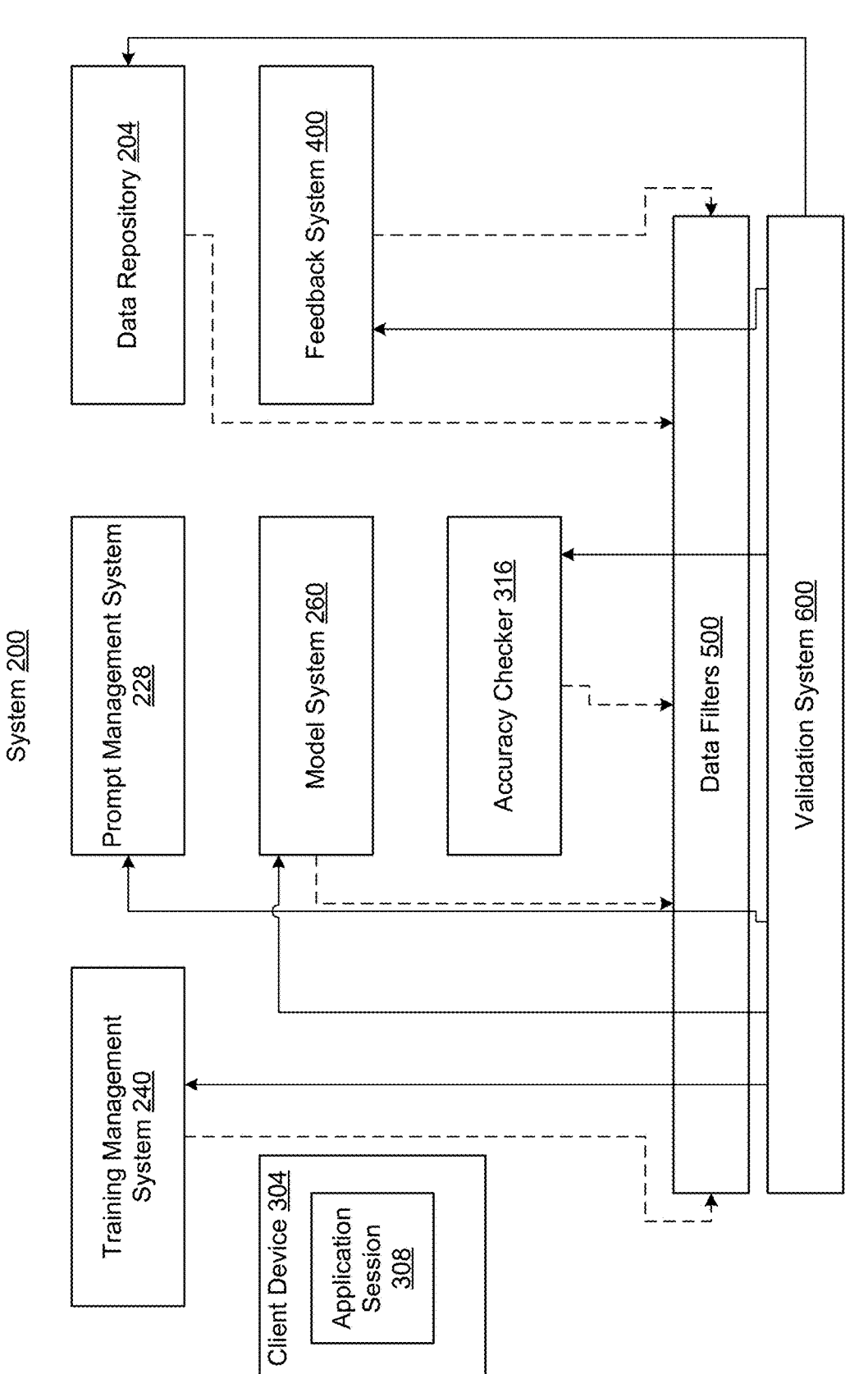
FIG. 6 is a block diagram of an example of the system of FIG. 2 including data validation components.

FIG. 6 depicts an example of the system 200, in which a validation system 600 is coupled with one or more components of the system 200, such as to process and/or modify data communicated between the components of the system 200. For example, the validation system 600 can provide a validation interface for human users (e.g., expert supervisors, checkers) and/or expert systems (e.g., data validation systems that can implement processes analogous to those described with reference to the data filters 500) to receive data of the system 200 and modify, validate, or otherwise process the data. For example, the validation system 600 can provide to human expert supervisors, human checkers, and/or expert systems various data of the system 200, receive responses to the provided data indicating requested modifications to the data or validations of the data, and modify (or validate) the provided data according to the responses.

For example, the validation system 600 can receive data such as data retrieved from the data repository 204, prompts outputted by the prompt management system 228, completions outputted by the model system 260, indications of accuracy outputted by the accuracy checker 316, etc., and provide the received data to at least one of an expert system or a user interface. In some implementations, the validation system 600 receives a given item of data prior to the given item of data being processed by the model system 260, such as to validate inputs to the machine learning models 268 prior to the inputs being processed by the machine learning models 268 to generate outputs, such as completions.

In some implementations, the validation system 600 validates data by at least one of (i) assigning a label (e.g., a flag, etc.) to the data indicating that the data is validated or (ii) passing the data to a destination without modifying the data. For example, responsive to receiving at least one of a user input (e.g., from a human validator/supervisor/expert) that the data is valid or an indication from an expert system that the data is valid, the validation system 600 can assign the label and/or provide the data to the destination.

The validation system 600 can selectively provide data from the system 200 to the validation interface responsive to operation of the data filters 500. This can enable the validation system 600 to trigger validation of the data responsive to collision of the data with the criteria of the data filters 500. For example, responsive to the data filters 500 determining that an item of data does not satisfy a corresponding criteria, the data filters 500 can provide the item of data to the validation system 600. The data filters 500 can assign various labels to the item of data, such as indications of the values of the thresholds that the data filters 500 used to determine that the item of data did not satisfy the thresholds. Responsive to receiving the item of data from the data filters 500, the validation system 600 can provide the item of data to the validation interface (e.g., to a user interface of client device 304 and/or application session 308; for comparison with a model, simulation, algorithm, or other operation of an expert system) for validation. In some implementations, the validation system 600 can receive an indication that the item of data is valid (e.g., even if the item of data did not satisfy the criteria of the data filters 500) and can provide the indication to the data filters 500 to cause the data filters 500 to at least partially modify the respective thresholds according to the indication.

In some implementations, the validation system 600 selectively retrieves data for validation where (i) the data is determined or outputted prior to use by the machine learning models 268, such as data from the data repository 204 or the prompt management system 228, or (ii) the data does not satisfy a respective data filter 500 that processes the data. This can enable the system 200, the data filters 500, and the validation system 600 to update the machine learning models 268 and other machine learning aspects (e.g., generative AI aspects) of the system 200 to more accurately generate data and completions (e.g., enabling the data filters 500 to generate alerts that are received by the human experts/expert systems that may be repairable by adjustments to one or more components of the system 200).

Figure 7:
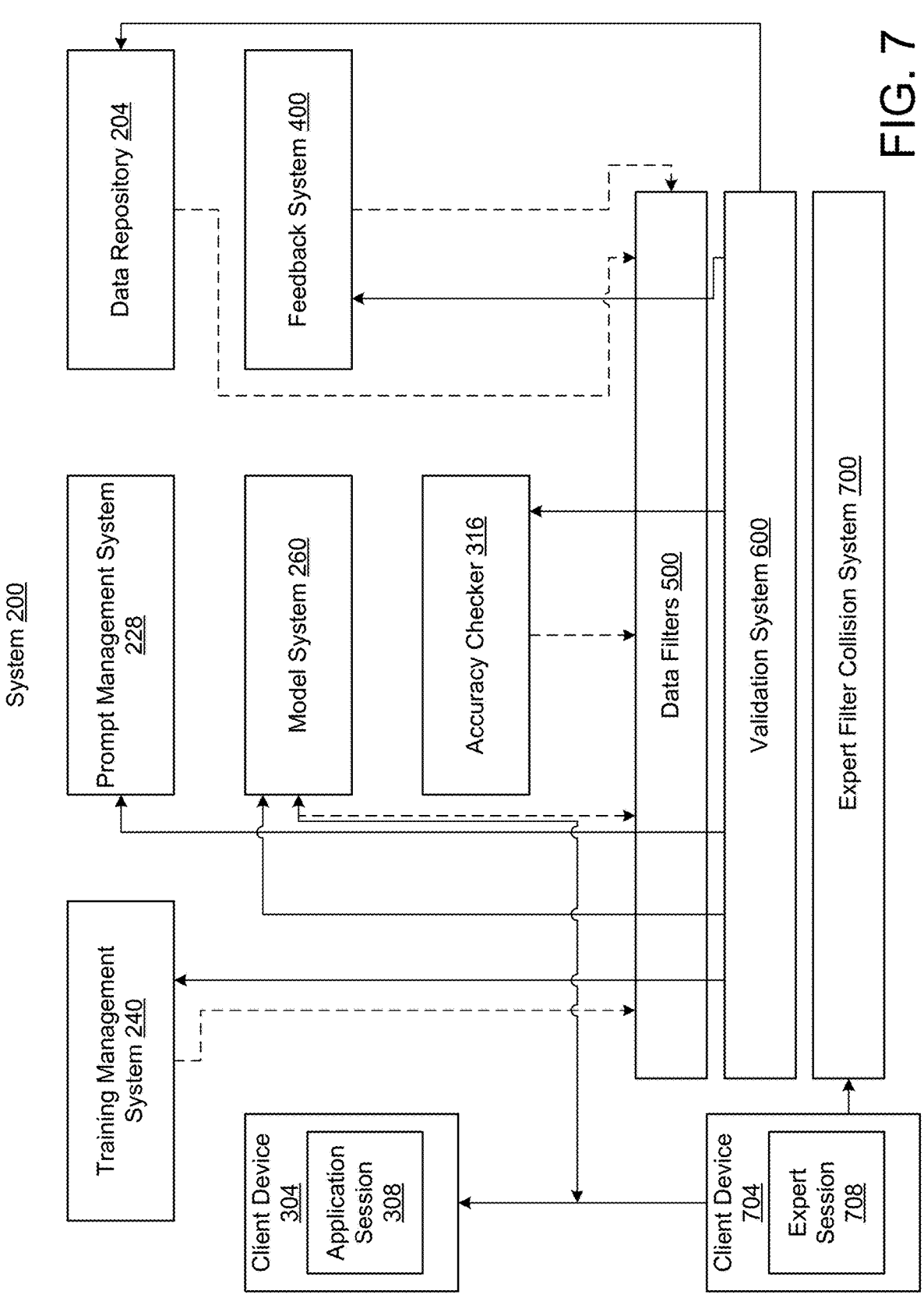
FIG. 7 is a block diagram of an example of the system of FIG. 2 including expert review and intervention components.

FIG. 7 depicts an example of the system 200, in which an expert filter collision system 700 ("expert system" 700) can facilitate providing feedback and providing more accurate and/or precise data and completions to a user via the application session 308. For example, the expert system 700 can interface with various points and/or data flows of the system 200, as depicted in FIG. 7, where the system 200 can provide data to the expert filter collision system 700, such as to transmit the data to a user interface and/or present the data via a user interface of the expert filter collision system 700 that can accessed via an expert session 708 of a client device 704. For example, via the expert session 708, the expert session 700 can enable functions such as receiving inputs for a human expert to provide feedback to a user of the client device 304; a human expert to guide the user through the data (e.g., completions) provided to the client device 304, such as reports, insights, and action items; a human expert to review and/or provide feedback for revising insights, guidance, and recommendations before being presented by the application session 308; a human expert to adjust and/or validate insights or recommendations before they are viewed or used for actions by the user; or various combinations thereof. In some implementations, the expert system 700 can use feedback received via the expert session as inputs to update the machine learning models 268 (e.g., to perform fine-tuning).

In some implementations, the expert system 700 retrieves data to be provided to the application session 308, such as completions generated by the machine learning models 268. The expert system 700 can present the data via the expert session 708, such as to request feedback regarding the data from the client device 704. For example, the expert system 700 can receive feedback regarding the data for modifying or validating the data (e.g., editing or validating completions). In some implementations, the expert system 700 requests at least one of an identifier or a credential of a user of the client device 704 prior to providing the data to the client device 704 and/or requesting feedback regarding the data from the expert session 708. For example, the expert system 700 can request the feedback responsive to determining that the at least one of the identifier or the credential satisfies a target value for the data. This can allow the expert system 708 to selectively identify experts to use for monitoring and validating the data.

In some implementations, the expert system 700 facilitates a communication session regarding the data, between the application session 308 and the expert session 708. For example, the expert session 700, responsive to detecting presentation of the data via the application session 308, can request feedback regarding the data (e.g., user input via the application session 308 for feedback regarding the data), and provide the feedback to the client device 704 to present via the expert session 708. The expert session 708 can receive expert feedback regarding at least one of the data or the feedback from the user to provide to the application session 308. In some implementations, the expert system 700 can facilitate any of various real-time or asynchronous messaging protocols between the application session 308 and expert session 708 regarding the data, such as any of text, speech, audio, image, and/or video communications or combinations thereof. This can allow the expert system 700 to provide a platform for a user receiving the data (e.g., customer or field technician) to receive expert feedback from a user of the client device 704 (e.g., expert technician). In some implementations, the expert system 700 stores a record of one or more messages or other communications between the sessions 308, 708 in the data repository 204 to facilitate further configuration of the machine learning models 268 based on the interactions between the users of the sessions 308, 708.

Referring further to FIGS. 1-7, various systems and methods described herein can be executed by and/or communicate with building data platforms, including data platforms of building management systems. For example, the data repository 204 can include or be coupled with one or more building data platforms, such as to ingest data from building data platforms and/or digital twins. The client device 304 can communicate with the system 200 via the building data platform, and can feedback, reports, and other data to the building data platform. In some implementations, the data repository 204 maintains building data platform-specific databases, such as to enable the system 200 to configure the machine learning models 268 on a building data platform-specific basis (or on an entity-specific basis using data from one or more building data platforms maintained by the entity).

For example, in some implementations, various data discussed herein may be stored in, retrieved from, or processed in the context of building data platforms and/or digital twins; processed at (e.g., processed using models executed at) a cloud or other off-premises computing system/device or group of systems/devices, an edge or other on-premises system/device or group of systems/devices, or a hybrid thereof in which some processing occurs off-premises and some occurs on-premises; and/or implemented using one or more gateways for communication and data management amongst various such systems/devices. In some such implementations, the building data platforms and/or digital twins may be provided within an infrastructure such as those described in U.S. patent application Ser. No. 17/134,661 filed Dec. 28, 2020, Ser. No. 18/080,360, filed Dec. 13, 2022, Ser. No. 17/537,046 filed Nov. 29, 2021, and Ser. No. 18/096,965, filed Jan. 13, 2023, and Indian patent application No. 202341008712, filed Feb. 10, 2023, the disclosures of which are incorporated herein by reference in their entireties.

As described above, systems and methods in accordance with the present disclosure can use machine learning models, including LLMs and other generative AI models, to ingest data regarding building management systems and equipment in various unstructured and structured formats, and generate completions and other outputs targeted to provide useful information to users. Various systems and methods described herein can use machine learning models to support applications for presenting data with high accuracy and relevance.

Figure 8:
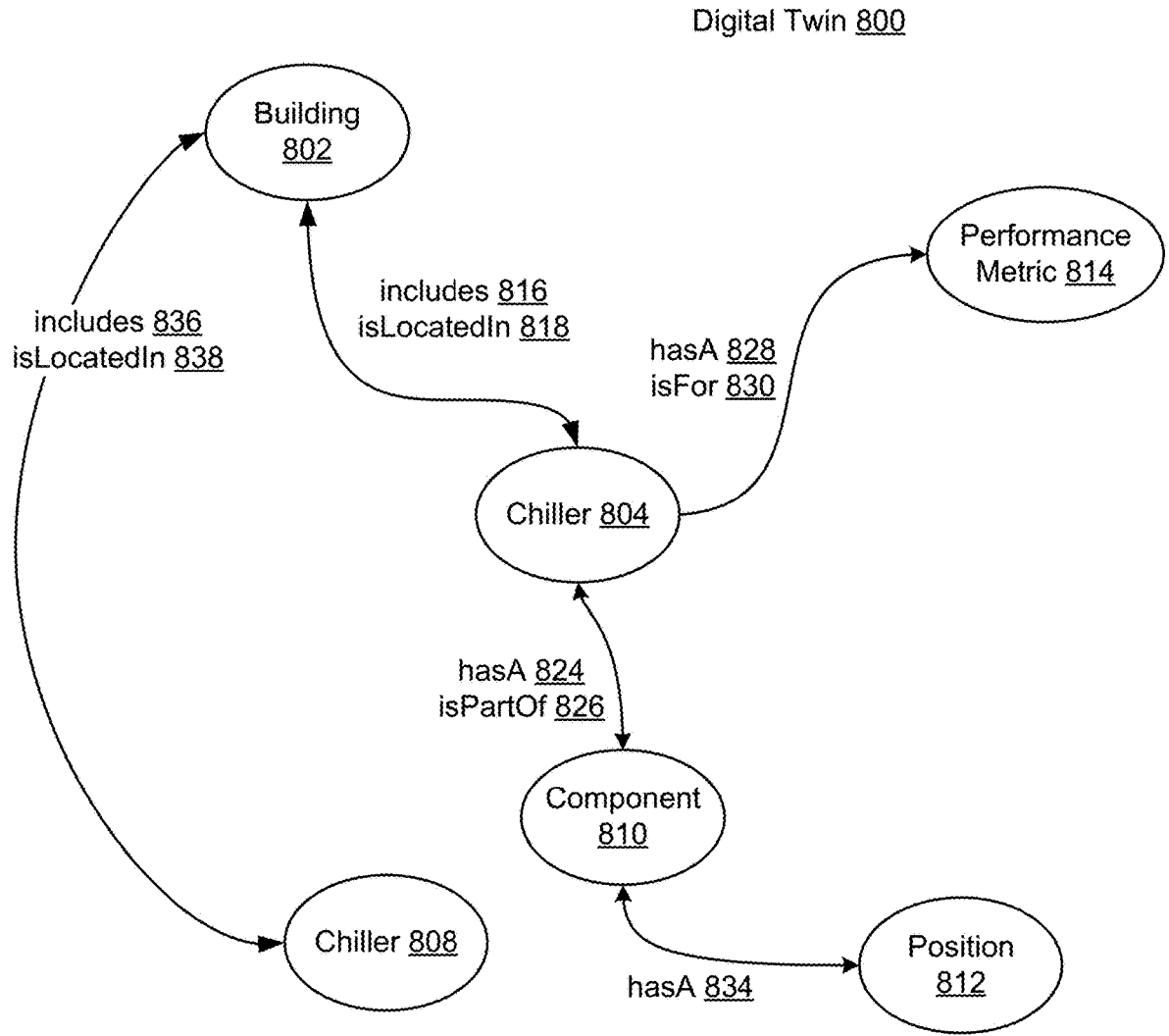
FIG. 8 is a block diagram of an example digital twin implemented by the system of FIG. 2.

FIG. 8 depicts an example of a digital twin 800. The digital twin 800 can be stored, managed, generated, or operated by the digital twin system 130. The digital twin 800 can be or include a knowledge graph, a graph data structure, a data file, a graphical building file (e.g., a building information model (BIM) file), or any other data structure that can store a representation of a building, campus, facility, or other physical or non-physical environment. The digital twin 800 can be generated by the digital twin system 130 and/or the model system 260. For example, the digital twin system 130 can communicate with the model system 260 to execute models 268 to generate or update the digital twin 800. The digital twin system 130 can generate the digital twin 800 to include nodes representing entities of a building and edges between the nodes, the edges representing relationships between the plurality of entities.

The digital twin 800 can include nodes 802-814. The digital twin 800 can include edges 816-838. The nodes 802-814 can represent entities of a building. For example, the entities can be points, data elements, data values, data metrics, events, people, users, technicians, spaces, zones, rooms, hallways, floors, buildings, devices, equipment, sensors, actuators, controllers, components, assets, etc. The equipment represented by the nodes can be temperature sensors, humidity sensors, pressure sensors, air quality sensors, controllers, etc. The digital twin 800 can include a building node 802. The building node 802 can represent a building. The digital twin 800 can include a chiller node 804. The chiller node 804 can represent a chiller. The node 802 can be related to the node 804 by edges 816 and 818. The edge 816 can be an "includes" edge while the edge 818 can be an "isLocatedIn" edge.

The digital twin 800 can include a component node 810. The component node 810 can represent a component of the chiller represented by the chiller node 804. The component could be a vane, a blower, a valve, a refrigerant line, a cold water line, a hot water line, a pump, a cooling tower, a condenser, an evaporator, an expansion valve, etc. Instead of node 804 representing a chiller and node 810 representing a component of the chiller, the node 804 can represent any type of building device and the node 810 can represent a component of the building device. The digital twin 800 can include a position node 812 representing the position on the chiller where the component represented by node 810 is located. The node 804 can be related to the node 810 by edges 824 and 826. The edge 824 can be a "hasA" edge. The edge 824 can be an "isPartOf" edge. The node 810 can be related to the node 812 by a "hasA" edge 834.

The digital twin 800 can include a performance metric node 814. The node 814 can represent, include, or store a data value of the chiller represented by the node 804 representing the performance of the chiller. For example, the performance can be an efficiency value or level, an amount of power consumed by the chiller, a runtime of the chiller, etc. Furthermore, the digital twin 800 can include a chiller node 808. The node 804 can be related to the node 814 via a "hasA" edge 828 and an "isFor" 830. The chiller node 808 can represent a second chiller different than the chiller represented by the chiller node 804. The node 808 can be related to the node 802 by edges 836 and 838. The edge 836 can be an "includes" edge while the edge 838 can be an "isLocatedIn" edge.

Figure 9:
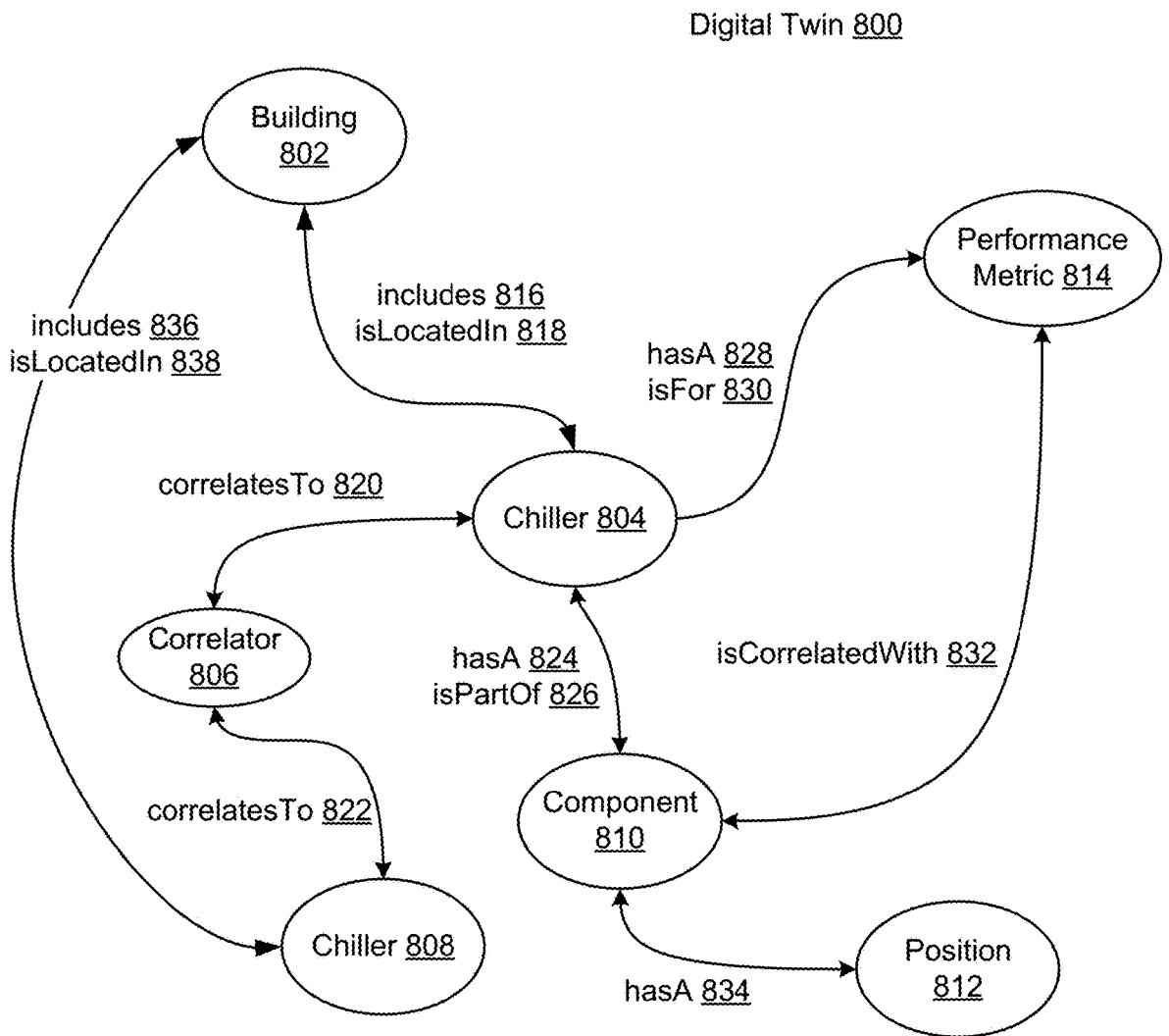
FIG. 9 is a block diagram of the example digital twin of FIG. 8, updated to include correlators identified by the system of FIG. 2.

FIG. 9 depicts the digital twin 800 of FIG. 8 updated based on an AI service. The AI service can be or include the model system 260 or the models 268. The AI service can include a generative AI, regression searcher, relative gain array searcher, an agent, AI agent, cognitive agent, LLM, or combination thereof. The digital twin system 130 can receive data relating to pieces of building equipment of a building. For example, the digital twin system 130 can receive at least a portion of the digital twin 800 (e.g., at least a portion of the nodes or edges of the digital twin 800), data from the data repository 204, or other data representing entities of a building (e.g., equipment, spaces, buildings, components, devices, etc.). The models 268 can generate the digital twin 800, or at least a portion of the digital twin 800. The models 268 can generate portions of the digital twin 800 using existing portions of the digital twin 800, the data of the data repository 204, telemetry data received from devices, configuration data of the devices, etc.

The model system 260 and/or the digital twin system 130 can be run, stored, executed, or operated on a cloud platform or remote service outside or external to a building. The model system 260 and/or the digital twin system 130 can run on an edge device within a building, such as on a gateway, controller, computer, edge server, etc. The determination of correlators can be performed in the cloud, at the edge, or distributed across multiple systems, devices, computing systems, etc.

The digital twin system 130 can cause the model system 260 to execute to generate or update the digital twin 800. For example, generating or updating the digital twin 800 can include generating new nodes or entities to represent a correlation between two or more entities of a building. Furthermore, generating or updating the digital twin 800 can include generating new edges or relationships between two or more entities to represent a correlation between the two or more entities. The model system 260 can generate correlators, e.g., edges or nodes, that represent an impact that one entity has on another entity. For example, the correlator can indicate that a first entity of a first entity type affects an operational performance, a fault status, a runtime, etc. of a second entity of a second entity type. The correlator can indicate that two entities are neighbors, one entity is a subsystem of another entity, one entity is an intersystem of another entity, one entity is dependent on another entity, one entity is a supersystem composed of other entities, a device entity is related to a location entity, a sensor entity is nearby a person entity (e.g., within a predefined distance of a location of the person). The correlators can be one to one correlators, or relate one entity to multiple other entities, or multiple entities to one entity.

Instances of the correlators can include data or metadata. The data can include a confidence level for the correlation between the entities that the AI service determines. The data can further include a covariance. The data can indicate a start time when the correlator was generated. The data can indicate a stop time when the correlator is scheduled to be removed, disabled, turned off, or deleted by the digital twin system 130. Responsive to the stop time being reached, the digital twin system 130 can remove the correlator. Furthermore, the AI service can re-evaluate correlations over time. Responsive to a score, such as a confidence score falling below a predefined level, the digital twin system 130 can deactivate, turn off, or otherwise remove the correlator. In this regard, the AI service and the digital twin system 130 can create and destroy nodes, edges, entities, or relationships in the digital twin 800 over time to autonomous create and modify the digital twin 800 to accurately represent a building or environment over time as the building or environment changes. For example, the building can change over time, new spaces created, spaces being repurposed for other uses, equipment being uninstalled, equipment being installed, equipment being replaced, equipment being serviced, etc.

The model system 260 can execute to output a correlator or correlator type without using any data indicating a direct relationship between a first entity and a second entity. For example, the model system 260 can infer or predict that the first entity and the second entity are related. For example, the model system 260 can use information that indirectly indicates that the first entity impacts, affects, or is correlated with the second entity or the performance of the second entity to infer the correlation between the first entity and the second entity. The model system 260 can be configured to autonomously generate or update the digital twin 800 without requiring manual user intervention.

In some embodiments, the digital twin system 130 can generate data to cause a graphical user interface to be displayed on the client device 304. The digital twin system 130 can generate a graphical user interface for the application session 308. A user can review the correlators or new correlator types generated by the model system 260 via the client device 304 and the graphical user interface. The user can provide input, a click, a touch input, a selection, etc. to approve or reject the addition of the new correlator edge or correlator entity to the digital twin 800 or the addition of a new correlator edge type or class or new correlator entity type or class to a library, repository, or database of available edge types or classes or available entity types or classes.

For example, the model system 260 can execute to receive at least one node or entity of the digital twin 800 as an input, at least one edge or relationship of the digital twin 800 as an input, telemetry data generate by building equipment, time-series data generated by building equipment, configuration data of building equipment, layout data, floor plan data, BIM data, etc. as an input to the model system 260. The model system 260 or a piece of software of the model system 260 can traverse the nodes or edges of the digital twin 800 to determine correlators. The data can be received as one or multiple strings of text data, either structured or unstructured data. The model system 260 can output at least one new relationship, edge, entity, or node or type of relationship, edge, entity, or node that represents a correlation between two entities or nodes of particular types within the digital twin. For example, the output of the model system 260 can be a particular edge, relationship, entity, or node. The model system 260 can receive one or multiple input strings and generate one or multiple output strings. The output strings can be, or represent, the digital twin 800 or portions of the digital twin 800. For example, the input strings can be unstructured input strings and the output strings can represent entities, nodes, edges, and/or relationships. The output strings can be formed in triples, e.g., with a subject entity, a predicate relationship, and an object entity. The output string can be data in a resource description framework (RDF) format, Turtle (Terse RDF Triple Language) format, TriG, N-Triples, etc. The model system 260 can train at least one model using machine learning to output the output string in the semantic triple.

Furthermore, the output of the model system 260 can be a new type of edge or relationship that can be added to a library, repository, ontology, schema, or list of available edges or relationships. The new type of edge can represent a correlation relationship that can exist between entities of particular types, e.g., a first entity of a first type and a second entity of a second type. Furthermore, the new type of entity can represent a new entity type that can be added to the digital twin 800 and added to the digital twin 800 to relate a first entity of a first type and a second entity of a second type. The updated library, repository, ontology, schema, or list can be used to deploy or update other digital twins, e.g., digital twins of other buildings other than the building that the digital twin 800 is generated for. The new type of edge can indicate or include a label, characteristic, parameter, attribute, or category describing a correlation or association. For example, the edge can indicate that one entity impacts another entity, that one entity measures a condition controlled by another entity, that one entity detects a fault state of another entity, that one entity is affected or impacted by another entity.

The model system 260 can generate, using the received data, at least one new relationship or edge for the digital twin 800 between a first entity of a first type (e.g., a first building equipment of the pieces of building equipment represented in the digital twin 800) and a second entity of a second type (e.g., at least one of second building equipment of the of pieces of building equipment or one or more entities associated with the building represented in the digital twin 800). For example, the model system 260 can identify that the component represented by node 810 has an impact on, or is correlated with, the performance metric represented by node 814. The model system 260 can identify a type or class of the node 810, e.g., a component class and identify a type or class of the node 814, e.g., a performance metric class. The model system 260 can output an edge type that represents an impact or correlation between nodes of a component class and nodes of a performance metric class.

Based on the edge type, the digital twin system 130 can generate an edge 832, "isCorrelatedWith," and update the digital twin 800 to store the edge 832 between the node 810 representing the component and the node 814 representing the performance metric. The digital twin system 130 can add the edge type of the edge 832 to a library, database, list, schema, ontology, or set of available relationship or edge types for the digital twin 800. The digital twin system 130 can identify other nodes of the digital twin 800 that can be related by an edge of the new edge type, e.g., a third node of the first node type and a fourth node of the second node type. The digital twin system 130 can update the digital twin 800 to include another edge of the new edge type between the third node and the fourth node. Based on patterns between nodes and edges in the digital twin 800 that indicate that the edge correlator should be implemented for the third node and the fourth node, the new edge can be generated with a correlation level, confidence level, or score.

Furthermore, the digital twin system 130 can generate, using the received data, at least one new entity for the digital twin 800, a new entity or node. The new entity or node can include a digital representation of a person associated with the building, a location within the building, an event associated with the building, an asset of the building, or a correlation indicator. The digital twin system 130 can generate and store the new entity or new node in the digital twin 800. For example, the digital twin system 130 can add the correlator node 806 into the digital twin 800. The digital twin system 130 can add an edge "correlatesTo" 820 between the node 804 and the node 806 and an edge "correlatesTo" 822 between the node 806 and the node 808. The edge 820, the node 806, and the edge 822 can indicate that the chiller represented by the node 804 is related, impacted, or correlated with the chiller represented by the node 808.

For example, the digital twin system 130 can store a type of the entity in a library, database, list, schema, ontology, or set of available entity types. The type of the entity can indicate a specific type of entity that can be used to relate two different entities of different entity types, e.g. a first entity of a first entity type and a second entity of a second entity type. The digital twin system 130 can identify other entities in the digital twin 800 of the first entity type and the second entity type, and add another node or entity representing the new entity type into the digital twin 800, and add an edge between a node representing the entity of the first entity type and the new node and another edge between another node representing the entity of the second entity type and the new node.

In some embodiments, the digital twin system 130 can cause the model system 260 to generate, instantiate, or spin up a model 268 that analyzes the correlation between two entities. For example, responsive to identifying that a first entity of the digital twin 800 is correlated with a second entity of the digital twin 800, the digital twin system 130 can instantiate and execute the model 268 responsive to detecting that the first entity is correlated with the second entity. The correlation model 268 can be an artificial intelligence service that can monitor the correlation between the two entities, determine a level of impact that the correlation might have, generate insights or recommendations based on the correlation, etc. The correlation model 268 can be an LLM or any other type of machine learning model. The correlation model 268 can run to detect that one component of the building is adversely effecting the performance of another piece of component, and generate a recommendation to replace the component, reposition the component within a building, etc.

In some implementations, the model system 260 and/or the correlation model 268 can implement causal artificial intelligence. For example, causal artificial intelligence can be an artificial intelligence or machine learning technique to explain, identify, or discover or identify cause and effect in a dataset. In some implementations, the causal artificial intelligence can include a fault tree, a root tree, a machine learning model, etc. In some implementations, the causal artificial intelligence can discover or identify causal relationships between pieces of building equipment, spaces of the building, points of the building, etc. The model system 260 can implement causal artificial intelligence to identify new causal relationships between nodes or entities of a building graph. The causal artificial intelligence can be or include a causal graph model, a Causal Bayesian network, or a causal inference algorithm.

The input to the correlation model 268 can be data of a building. For example, the correlation model 268 can receive telemetry data for a building, telemetry data from the two entities, operational data, or any other information. The correlation model 268 can receive a portion or all of the data of the data repository 204. The correlation model 268 can receive a portion of the digital twin 800 as an input. The correlation model 268 can output data indicating the impact that one entity has on another entity, recommendations for increasing or decreasing the impact, recommendations to improve the performance of the entities, etc. The recommendations can be replacing components, servicing components, changing the operating settings of the components, etc.

The model system 260 can identify additional entities that have the same correlation as existing entities that have a correlation model 268 already running. The model system 260 can determine that the entities are of a class or type that is the same as the entities that the correlation model 268 is already running for. For example, if the correlation model 268 is running for a first correlation between a first entity of a first entity type and a second entity of a second entity type, the correlation model 268 can detect that a second correlation exists for a third entity of the first entity type and a fourth entity of the second entity type. Responsive to determining that the third and fourth entities have a correlation, the model system 260 can duplicate or replicate the already running correlation model 268 to generate a new instance of the correlation model 268. The new instance of the correlation model 268 can be trained or have been tuned while running for the first entity and the second entity, and therefore, any information that the correlation model 268 learns from running for the first entity and the second entity can be transferred to the new correlation model 268 that can be instantiated and run for the third entity and the fourth entity. Responsive to replicating the correlation model 268, the replicated correlation model 268 can be deployed or instantiated and run based on data to generate an output indicating the impact that the third entity has on the fourth entity.

The model system 260 can run at least one instance of the correlation model 268 for a length of time. For example, the model system 260 can generate an instance of the correlation model 268 with an expiration time or a run time. Once the run time expires, or the expiration time is reached, the model system 260 can shut down or stop running the correlation model 268. In this regard, the model system 260 can avoid running a correlation model 268 for an extended duration of time and consuming excessive resources.

The correlation model 268 can filter data to identify insights or recommendations. Furthermore, the correlation model 268 can update itself overtime. Responsive to the correlation model 268 updating itself, the correlation model 268 can version itself in a version repository. In this regard, the correlation model 268 can generate a history of versions of the correlation model 268 over time. In some embodiments, the correlation model 268 generates or discovers potential new correlations between entities, surfaces the new correlates to a user or analyst, and receives an input from the user or analyst. The input can be a confirmation that the new correlation is a real correlation and not noise, or to add the new correlation to the digital twin 800.

For example, the model system 260 can track confidence levels for various potential correlators to add to the graph, e.g., new nodes or edges, or existing nodes or edges in the graph. Responsive to a confidence level for a correlator exceeding a threshold, the model system 260 can surface the correlator for user review in a user interface, and upon user approval, the model system 260 can cause the correlator to be added to the digital twin 800. Furthermore, if the confidence level of a correlator falls below at threshold, the correlator can be removed form the digital twin 800, e.g., a node or edge can be deleted from the digital twin 800. In some implementations, every edge or node of the digital twin 800 can be tracked with a confidence level. The model system 260 can update each node object or edge object to store the confidence level output by the model system 260. A graphical user interface system that visualizes and displays the graph can display the confidence levels of the various nodes or edges of the digital twin 800. The graphical user interface can display the graph on a display of a client device 304. For example, the confidence levels can be displayed numerically, or the weight or color of lines drawn to represent the nodes or edges can be based on the confidence. For example, a higher confidence level can result in an edge being shown with a thick or black line, while a lower confidence level can result in the edge being shown with a thinner or gray line or a dotted line.

The model system 260 can constantly improve and change the digital twin 800 while the digital twin 800 is implemented. For example, after an initial install and setup process, the model system 260 can periodically run the correlation model 268 as a background process to discover new correlations in the digital twin 800. The model system 260 can update and change the digital twin 800 while the digital twin 800 is deployed and other applications may be running on the digital twin 800. This can update, change, or increase the performance of the applications running on the digital twin 800.

In general, the model system 260 can allow the digital twin 800 to increase in fidelity over time, adding or removing nodes or edges of the digital twin 800 based on the execution of the correlation model 268. In some implementations, learned correlations of one building can be applied to another building. For example, if one building discoverers that a digital twin 800 should have a new edge between two existing nodes, this can cause another building system to add a similar edge to similar existing nodes of another digital twin 800 of the other building. In this regard, learning from one building can be transferred to another building. In some implementations, the model system 260 can produce templates for various types of buildings (schools, hospitals, apartment buildings) or spaces (e.g., conference rooms, apartments, hallways, etc.) that defines what nodes and edges should be correlated. The model system 260 can apply the template when setting up a digital twin 800 for a new building based on the type of the new building.

Figure 10:
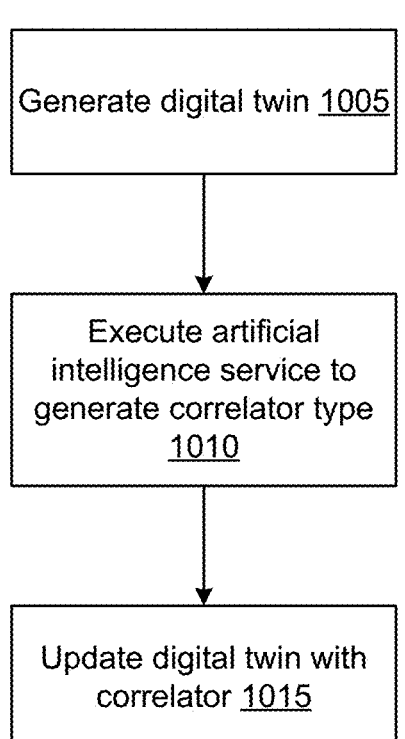
FIG. 10 is a flow diagram of a method of generating correlator types for a digital twin and updating the digital twin with a correlator.

FIG. 10 depicts an example of a method 1000. The method 1000 can be performed using various devices and systems described herein, including but not limited to, the systems 100, 200 or one or more components thereof. Various aspects of the method 1000 can be implemented using one or more devices or systems that are communicatively coupled with one another, including in client-server, cloud-based, or other networked architectures.

At 1005, the method 1000 can include generating a digital twin. For example, the digital twin system 130 and/or the model system 260 can generate the digital twin 800. For example, the digital twin system 130 can generate, save, store, or instantiate the digital twin 800 as a database, data structure, building graph, etc. The digital twin system 130 can generate that digital twin 800 by causing the model system 260 to implement an LLM to convert at least one input string into an output string that is, or represents, the digital twin 800. For example, the LLM can consume data of the data repository 204 to produce the digital twin 800.

At 1010, the method 1000 can include executing an artificial intelligence service to generate a correlator type. For example, the digital twin system 130 can communicate with the model system 260 to trigger the model system 260 to execute a model 268 to generate a correlation type that indicates that at least two entities represented in the digital twin 800 are correlated with one another. For example, the model 268 can receive at least a portion of the digital twin 800 as an input, e.g., at least one node or edge. Furthermore, the model 268 can receive at least a portion of the data repository 204. The model 268 can output an indication a correlation between two entities represented in the digital twin 800. Furthermore, the model 268 can output data indicating a new correlation type. For example, the model 268 can generate a class or type for an edge or entity. The class or type can indicate a new correlation that can exist between an entity of a first type and an entity of a second type. The digital twin system 130 can add the new edge or entity type or class into an ontology, list of available edge types, list of available node types, etc.

At 1015, the method 1000 can update a digital twin with a correlator. For example, the digital twin system 130 can update the digital twin 800 with at least one new edge, one new node, one new relationship, or one new entity. The digital twin system 130 can implement a piece of data in the digital twin 800 based on the correlator type. For example, the digital twin system 130 can add a new node to the digital twin 800 based on a new node type stored in the ontology or schema of the digital twin 800. For example, the digital twin system 130 can add a new entity to the digital twin 800 based on a new entity type stored in the ontology or schema of the digital twin 800. For example, the digital twin system 130 can add a new edge to the digital twin 800 based on a new edge type stored in the ontology or schema of the digital twin 800. For example, the digital twin system 130 can add a new relationship to the digital twin 800 based on a new relationship type stored in the ontology or schema of the digital twin 800.

In addition, or instead of updating the digital twin 800, the digital twin system 130 can perform one or more actions for the building using a correlator identified between two entities. For example, the digital twin system 130 can generate control changes based on the correlation. For example, if a valve is correlated with an increase in energy consumption of an HVAC device, the digital twin system 130 can generate a command to operate the valve to close or open the valve. Furthermore, if a room is associated with a decrease in occupant comfort, the digital twin system 130 can generate a command to operate a thermostat to increase the temperature of the room.

The correlators can be temporary or persistent. For example, the edge 832 or the edge 820, the node 806, and the edge 822 can be persistent nodes or edges or temporary nodes or edges. The nodes or edges can be added for a predefined or variable length of time. Responsive to the time expiring, the digital twin system 130 can remove, hide, or delete the nodes or edges. In some embodiments, the nodes or edges can be permanent. The nodes or edges may not be added by the digital twin system 130 without any expiration time.

The new correlator edges or nodes can be stored as classes in an ontology or schema such that the edges or nodes are queryable or discoverable when a system or user makes a query or request in the ontology or schema. Furthermore, the new correlator edges or nodes can be used to diagnose problems and/or enrich other datasets or digital twins.

In some implementations, information from the service request, prescription, and application session processes can be used to perform analytics regarding entities that maintain sites and items of equipment (e.g., to evaluate customer churn). For example, information including unstructured data (e.g., service reports) regarding items of equipment and entity engagement or disengagement (e.g., deals) can be correlated to identify patterns regarding ways that service can be performed to maintain or increase the likelihood of increasing performance of one or more items of equipment of the entity, completion of deals or of maintaining engagement with the entity.

The techniques described herein can be applied to data structures of any type, and are not limited to digital twins. For example, an AI service can generate and store correlations outside of a digital twin environment. For example, the AI service can identify and create classes for correlations between information, entities, data, or items in different types of storage systems such as databases, tables, strings, etc. The AI service can implement an LLM, generative AI, or any other AI system to discover new, previously undefined correlations between pieces of information and store the correlations for use in defining future relationships. The AI service can use the correlation to identify a relationship between particular instances of entities. The AI service can use the correlation to genericize a class of relationship between different classes of entities.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed:

1. A building system comprising:
   one or more storage devices storing instructions thereon, that, when executed by one or more processors, cause the one or more processors to:
   generate a building graph, the building graph comprising a plurality of nodes representing a plurality of entities of a building and a plurality of edges between the plurality of nodes, the plurality of edges representing relationships between the plurality of entities;

execute an artificial intelligence service including a large language model, the artificial intelligence service to:

receive at least one of data describing the plurality of entities, at least one node of the plurality of nodes, or at least one edge of the plurality of edges as an input;

execute the large language model on the data to discover a correlator type that identifies that a first entity type of a first entity of the plurality of entities impacts a second entity type of a second entity of the plurality of entities; and output the correlator type and add the correlator type to a list of available correlator types; and update the building graph to include data representing a correlator based on the correlator type added to the list of available correlator types.

2. The building system of claim 1, wherein the instructions cause the one or more processors to:

execute the artificial intelligence service to output an indication to decorrelate a first node of the plurality of nodes and a second node of the plurality of nodes of the building graph; and remove an edge of the plurality of edges between the first node and the second node responsive to the indication to decorrelate the first node and the second node.

3. The building system of claim 1, wherein the instructions cause the one or more processors to:

execute the artificial intelligence service after the building graph is deployed for the building to detect changes to the building that occur after the building graph is deployed; and update the building graph while the building graph is deployed responsive to detecting the changes.

4. The building system of claim 1, wherein the large language model receives at least a portion of the building graph as a plurality of input strings and outputs the correlator type as an output string.

5. The building system of claim 1, wherein the instructions cause the one or more processors to:

generate an entity type for an entity to represent a correlation between the first entity of the first entity type and the second entity of the second entity type; and update the building graph to store a node representing the entity, a first edge between a first node representing the first entity and the node, and a second edge between a second node representing the second entity and the node.

6. The building system of claim 1, wherein the correlator indicates that the first entity of the first entity type affects an operational performance of the second entity of the second entity type.

7. The building system of claim 1, wherein the instructions cause the one or more processors to:

execute the artificial intelligence service to output the correlator type without using any data indicating a direct relationship between the first entity and the second entity.

8. The building system of claim 1, wherein the instructions cause the one or more processors to:

generate data to cause a graphical user interface to display the correlator type;

receive input from a user via the graphical user interface; and update the building graph with the correlator type responsive to a reception of the input from the user via the graphical user interface.

9. The building system of claim 1, wherein the plurality of edges are defined based on a plurality of available edge types;

wherein the instructions cause the one or more processors to:

generate an edge type that indicates a correlation between the first entity of the first entity type and the second entity of the second entity type; and update the building graph to store an edge based on the edge type between a first node representing the first entity and a second node representing the second entity.

10. The building system of claim 9, wherein the instructions cause the one or more processors to:

identify a third entity of the first entity type represented by a third node in the building graph;

identify a fourth entity of the second entity type represented by a fourth node in the building graph;

generate a second edge of the edge type responsive to an identification of the third entity of the first entity type and the fourth entity of the second entity type; and update the building graph to store the second edge between the third node and the fourth node.

11. The building system of claim 1, wherein the instructions cause the one or more processors to:

instantiate a correlator artificial intelligence service to process data based on the first entity impacting the second entity; and execute the correlator artificial intelligence service to generate output data indicating an impact that the first entity has on the second entity.

12. The building system of claim 11, wherein the instructions cause the one or more processors to:

identify a third entity impacting a fourth entity in the building graph;

replicate the correlator artificial intelligence service to generate a second correlator artificial intelligence service; and execute the second correlator artificial intelligence service to generate second output data indicating an impact that the third entity has on the fourth entity.

13. The building system of claim 12, wherein the instructions cause the one or more processors to:

instantiate the correlator artificial intelligence service to run for a length of time;

execute the correlator artificial intelligence service until the length of time expires; and stop executing the correlator artificial intelligence service in response to the length of time expiring.

14. A method comprising:

generating, by one or more processing circuits, a building graph, the building graph comprising a plurality of nodes representing a plurality of entities of a building and a plurality of edges between the plurality of nodes, the plurality of edges representing relationships between the plurality of entities;

executing, by the one or more processing circuits, an artificial intelligence service including a large language model, the artificial intelligence service to:

receive at least one of data describing the plurality of entities, at least one node of the plurality of nodes, or at least one edge of the plurality of edges as an input;

execute the large language model on the data to discover a correlator type that identifies that a first entity type of a first entity of the plurality of entities impacts a second entity type of a second entity of the plurality of entities; and output the correlator type and add the correlator type to a list of available correlator types; and updating, by the one or more processing circuits, the building graph to include data representing a correlator based on the correlator type added to the list of available correlator types.

15. The method of claim 14, wherein the large language model receives at least a portion of the building graph as a plurality of input strings and outputs the correlator type as an output string.

16. The method of claim 14, comprising:

generating, by the one or more processing circuits, an entity type for an entity to represent a correlation between the first entity of the first entity type and the second entity of the second entity type; and updating, by the one or more processing circuits, the building graph to store a node representing the entity, a first edge between a first node representing the first entity and the node, and a second edge between a second node representing the second entity and the node.

17. The method of claim 14, wherein the correlator indicates that the first entity of the first entity type affects an operational performance of the second entity of the second entity type.

18. The method of claim 14, comprising:

executing, by the one or more processing circuits, the artificial intelligence service to output the correlator type without using any data indicating a direct relationship between the first entity and the second entity.

\* \* \* \* \*